US012418122B2

(12) United States Patent
Ashibu

(10) Patent No.: US 12,418,122 B2
(45) Date of Patent: Sep. 16, 2025

(54) CONNECTOR, DEVICE PROVIDED WITH THE CONNECTOR, MOUNTING METHOD OF THE CONNECTOR, MATING CONNECTOR AND MATING DEVICE PROVIDED WITH THE MATING CONNECTOR

(71) Applicant: Japan Aviation Electronics Industry, Limited, Tokyo (JP)

(72) Inventor: Kenta Ashibu, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 420 days.

(21) Appl. No.: 17/990,836

(22) Filed: Nov. 21, 2022

(65) Prior Publication Data

US 2023/0198179 A1 Jun. 22, 2023

(30) Foreign Application Priority Data

Dec. 20, 2021 (JP) ................................. 2021-206301

(51) Int. Cl.

*H01R 12/71* (2011.01)
*H01R 12/55* (2011.01)
(Continued)

(52) U.S. Cl.

CPC ........... *H01R 12/716* (2013.01); *H01R 12/55* (2013.01); *H01R 13/2407* (2013.01); *H01R 13/405* (2013.01)

(58) Field of Classification Search

CPC ... H01R 12/716; H01R 12/55; H01R 13/2407
See application file for complete search history.

(56) References Cited

U.S. PATENT DOCUMENTS 5,409,406 A * 4/1995 McClure .............. H01R 12/716 D13/133
9,077,102 B2 7/2015 Miyazaki
(Continued)

FOREIGN PATENT DOCUMENTS

JP 2000-200110 A 7/2000
JP 2004103491 A 4/2004
(Continued)

OTHER PUBLICATIONS

Office Action issued in Korean Patent Application No. 10-2022-0162194 on May 27, 2024 (with English translation).
(Continued)

*Primary Examiner* — Renee S Luebke
*Assistant Examiner* — Paul D Baillargeon
(74) *Attorney, Agent, or Firm* — Collard & Roe, P.C.

(57) ABSTRACT

A connector has terminals and a housing. The terminals are arranged in a pitch direction. The terminal has first and second mount portions, first and second contact portions and a supporting portion. The supporting portion extends from the first contact portion to support the second contact portion. The second contact portion faces the first contact portion in a width direction and is movable due to resilient deformation of the supporting portion. The second mount portion is formed on the supporting portion and apart from the first mount portion in the width direction. The first and the second mount portions protrude downward from a bottom surface of the housing. In a plane perpendicular to the pitch direction, the first and the mount portions and the first and the second contact portions of each of the terminals are identical with those of any other of the terminals, respectively.

16 Claims, 30 Drawing Sheets

(51) Int. Cl.
*H01R 13/24* (2006.01)
*H01R 13/405* (2006.01)

(56) References Cited

U.S. PATENT DOCUMENTS

| | | | | |
|---|---|---|---|---|
| 9,647,361 | B2 * | 5/2017 | Kobuchi .............. | H01R 12/707 |
| 10,516,228 | B2 * | 12/2019 | Takenaga ............. | H01R 12/716 |
| 2008/0026609 | A1 | 1/2008 | Kuwana et al. | |
| 2018/0198241 | A1 * | 7/2018 | Ooi .................... | H01R 13/6597 |

FOREIGN PATENT DOCUMENTS

| | | | |
|---|---|---|---|
| JP | 2008-034283 | A | 2/2008 |
| JP | 2012-164528 | A | 8/2012 |
| JP | 2016-152083 | A | 8/2016 |
| JP | 2017-073355 | A | 4/2017 |
| JP | 6241712 | B2 | 12/2017 |
| JP | 2019-046670 | A | 3/2019 |
| KR | 20190026564 | A | 3/2019 |

OTHER PUBLICATIONS

Japanese Office Action dated Jul. 30, 2025 in Japanese Patent Application No. 2021-206301, with English translation.

* cited by examiner

XXVIIII-A

XXVIIII-B

XXX-A

XXX-B

CONNECTOR, DEVICE PROVIDED WITH THE CONNECTOR, MOUNTING METHOD OF THE CONNECTOR, MATING CONNECTOR AND MATING DEVICE PROVIDED WITH THE MATING CONNECTOR

CROSS REFERENCE TO RELATED APPLICATIONS

This application is based on and claims priority under 35 U.S.C. § 119 to Japanese Patent Application No. JP2021-206301 filed Dec. 20, 2021, the contents of which are incorporated herein in their entirety by reference.

BACKGROUND OF THE INVENTION

This invention relates to a connector and peripheral technology thereof, particularly, to a connector provided with a plurality of terminals arranged in a pitch direction and peripheral technology thereof.

JP 2019-46670 A (Patent Document 1) discloses a connector provided with a plurality of terminals arranged in a pitch direction and a mating connector mateable with the connector.

Referring to FIGS. 31 and 31A, a connector 90 disclosed in Patent Document 1 is provided with a plurality of terminals 92 and a housing 94 which holds the terminals 92. The terminals 92 are held by the housing 94 to form two terminal rows. In each of the terminal rows, the terminals 92 are arranged in a pitch direction or an X-direction. The two terminal rows are arranged in a lateral direction or a Y-direction perpendicular to the pitch direction.

As shown in FIG. 32, each of the terminals 92 of the connector 90 is provided with a mount portion 921, a held portion 923, a supporting portion 925, a first contact portion 927 and a second contact portion 929. When the connector 90 is mounted on a substrate (not shown), the mount portion 921 is fixed to the substrate. The held portion 923 is held by the housing 94. The supporting portion 925 extends from the first contact portion 927 and supports the second contact portion 929.

As understood from FIGS. 31 and 31A, in each of the terminal rows, the terminals 92 are oriented in the same direction. In detail, in each of the terminal rows, the terminals 92 are arranged so that the mount portions 921 of them are oriented outward in a width direction or a Y-direction. When viewed along the pitch direction or the X-direction, the terminals 92 of each of the terminal rows are identical with one another.

As understood from FIGS. 31 and 31A, a mating connector 100 is provided with mating terminals 110 which correspond to the terminals 92 of the connector 90, respectively, and a mating housing 120 which holds the mating terminals 110. The mating terminals 110 are held by the mating housing 120 to form two mating terminal rows. In each of the mating terminal rows, the mating terminals 110 are arranged in the pitch direction. The two mating terminal rows are arranged in the width direction perpendicular to the pitch direction.

As shown in FIGS. 31 and 31A, each of the mating terminals 110 is provided with a mating mount portion 111, a mating held portion 113 and a U-shaped portion 115. When the mating connector 100 is mounted on a mating substrate (not shown), the mating mount portion 111 is fixed to the mating substrate. The mating held portion 113 is held by the mating housing 120. When the connector 90 and the mating connector 100 are mated with each other, the U-shaped portion 115 is inserted into between the first contact portion 927 and the second contact portion 929 of the terminal 92 and is electrically connected to the first contact portion 927 and the second contact portion 929.

As understood from FIGS. 31 and 31A, in each of the mating terminal rows, the mating terminals 110 are arranged so that the mating mount portions 111 of them are oriented outward in the width direction. In other words, when viewed along the pitch direction, the mating terminals 110 of each of the mating terminal rows are identical with one another.

In the connector 90 disclosed in Patent Document 1, a shortest distance between two of the terminals 92 which are adjacent to each other in the pitch direction depends on an arrangement of pads which are formed on the substrate to correspond to the mount portions 921 of the terminals 92, respectively. Here, two of the pads which are adjacent to each other in the pitch direction are spaced so that they are prevented from electrically connecting to each other. Accordingly, the connector 90 disclosed in Patent Document 1 has a problem that it is difficult to reduce a distance between the terminals 92 adjacent to each other in the pitch direction.

SUMMARY OF THE INVENTION

It is therefore an object of this invention to provide a method of manufacturing a connector which can reduce a distance between terminals adjacent to each other in a pitch direction. It is another object of the invention to provide a connector which can reduce a distance between terminals adjacent to each other in a pitch direction. It is yet another object of the invention to provide a device which is provided with the connector mentioned above. It is still another object of the invention to provide a mating connector which is mateable with the connector mentioned above. It is further yet another object of the invention to provide a mating device which is provided with the mating connector mentioned above.

One aspect of the present invention provides a method of mounting a connector on a substrate. The connector comprises a plurality of terminals and a housing which holds the terminals. The housing has a bottom surface. The terminals are arranged in a pitch direction. Each of the terminals has a first mount portion, a second mount portion, a first contact portion, a second contact portion and a supporting portion. The supporting portion is resiliently deformable at least in part and extends from the first contact portion to support the second contact portion. The second contact portion faces the first contact portion in a width direction perpendicular to the pitch direction and is movable in the width direction by using resilient deformation of the supporting portion. The second mount portion is formed on a part of the supporting portion and apart from the first mount portion in the width direction. The first mount portion and the second mount portion protrude downward from the bottom surface of the housing in an up-down direction perpendicular to both the pitch direction and the width direction. In a plane perpendicular to the pitch direction, positions of the first mount portion, the second mount portion, the first contact portion and the second contact portion of each of the terminals are identical with those of any other of the terminals. The method comprises soldering the first mount portion of one of two of the terminals adjacent to each other in the pitch direction to a pad on the substrate, and soldering the second mount portion of a remaining one of the adjacent terminals to another pad on the substrate.

Another aspect of the present invention provides a connector which comprises a plurality of terminals and a housing which holds the terminals. The housing has a bottom surface. The terminals are arranged in a pitch direction. Each of the terminals has a first mount portion, a second mount portion, a first contact portion, a second contact portion and a supporting portion. The supporting portion is resiliently deformable at least in part and extends from the first contact portion to support the second contact portion. The second contact portion faces the first contact portion in a width direction perpendicular to the pitch direction and is movable in the width direction by using resilient deformation of the supporting portion. The second mount portion is formed on a part of the supporting portion and apart from the first mount portion in the width direction. The first mount portion and the second mount portion protrude downward from the bottom surface of the housing in an up-down direction perpendicular to both the pitch direction and the width direction. In a plane perpendicular to the pitch direction, positions of the first mount portion, the second mount portion, the first contact portion and the second contact portion of each of the terminals are identical with those of any other of the terminals.

Yet another aspect of the present invention provides a device which comprises the connector mentioned above and the substrate. A plurality of pads is arranged on the substrate in staggered arrangement. The pads correspond to the terminals, respectively. To each of the pads, one of the first mount portion and the second mount portion of the terminal corresponding thereto is fixed. The first mount portions and the second mount portions of the terminals arranged in the pitch direction are fixed to the pads, alternately.

Still another aspect of the present invention provides a mating connector which is mateable with the connector mentioned above. The mating connector comprises a plurality of mating terminals and a mating housing which holds the mating terminals. One of two of the mating terminals adjacent to each other in the pitch direction has a first mating mount portion, and a remaining one of the adjacent mating terminals has a second mating mount portion. One of two of the mating terminals adjacent to each other in the pitch direction does not have the second mating mount portion. The first mating mount portion and the second mating mount portion are apart from each other in the width direction.

Further yet another aspect of the present invention provides a mating device which comprises the mating connector mentioned above and a mating substrate. On the mating substrate, a plurality of mating pads is arranged in staggered arrangement. The mating pads correspond to the mating terminals, respectively. To each of the mating pads, either the first mating mount portion or the second mating mount portion of the mating terminal corresponding thereto is fixed. The first mating mount portions and the second mating mount portions of the mating terminals arranged in the pitch direction are fixed to the mating pads, alternately.

According to the method of the present invention, regarding two of the terminals which are adjacent to each other in the pitch direction, the first mount portion of one of them is soldered to a pad on the substrate while the second mount portion of the remaining one of them is soldered to another pad on the substrate. With this structure, two pads on the substrate which respectively correspond to the two terminals adjacent to each other in the pitch direction can be arranged at a location deviated from each other in the width direction. Accordingly, in the pitch direction, it is unnecessary to leave a space between the pads, in fact, the pads can be arranged so that they are overlapped with each other. Therefore, in the pitch direction, a distance between the terminal adjacent to each other can be reduced.

According to the connector of the present invention, each of the terminals has the first mount portion and the second mount portion which is apart from the first mount portion in the width direction. With this structure, one of the two terminals adjacent to each other can be fixed to the substrate by using the first mount portion thereof while the remaining one of the adjacent terminals can be fixed to the substrate by using the second mount portion thereof. As a result, restriction derived from the substrate on which the connector is mounted can be eased, and a distance between the two terminals adjacent to each other in the pitch direction can be reduced.

In addition, according to the connector of the other aspect of this invention, each of the terminals has the first contact portion and the second contact portion. In the plane perpendicular to the pitch direction, positions of the first contact portion and the second contact portion of each of the terminals are identical with those of any other of the terminals. Accordingly, it can be easy to control an insertion and extraction force of the connector with respect to the mating connector. Therefore, restriction derived from the insertion and extraction force is eased when the number of the terminals of the connector is increased. Setting the insertion and extraction force to a minimum allows abrasion of the terminals to be suppressed, and thereby high connection reliability can be obtained. Similar advantage can be obtained in the mating connector of the still other aspect of this invention.

An appreciation of the objectives of the present invention and a more complete understanding of its structure may be had by studying the following description of the preferred embodiment and by referring to the accompanying drawings.

Figure 1:
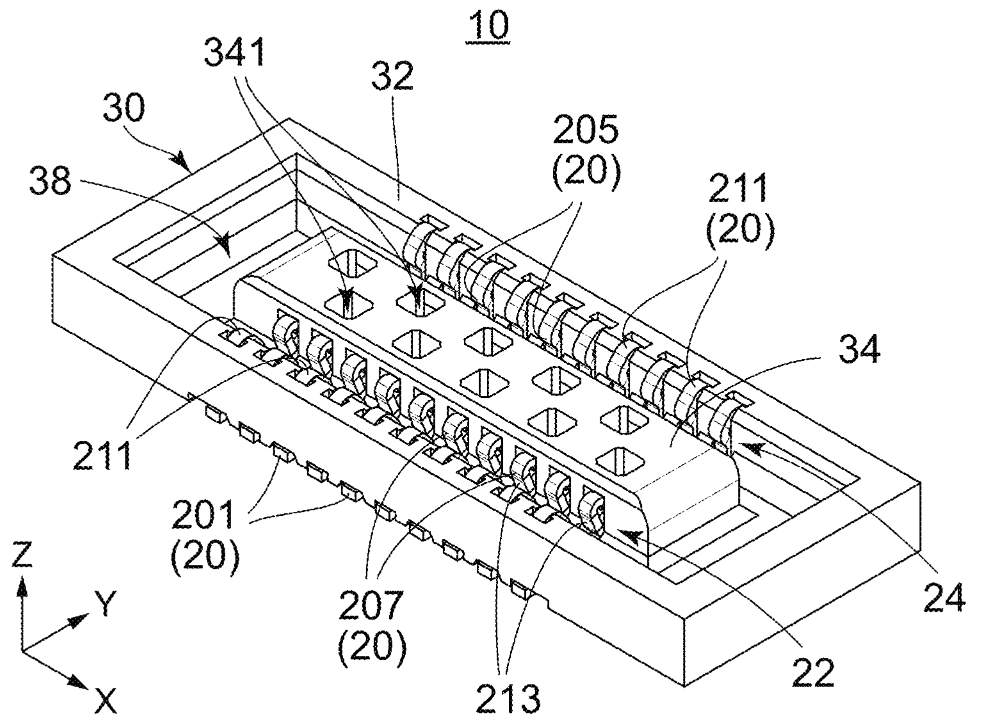
FIG. 1 is a perspective view showing a connector according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Referring to FIG. 1, a connector 10 according to a first embodiment of the present invention is provided with a plurality of terminals 20 and a housing 30 which holds the terminals 20. In the present embodiment, each of the terminals 20 is formed of a sheet metal, and the housing 30 is made of insulation resin. In the present embodiment, the terminals 20 are held by the housing 30 by means of press-fitting. However, the present invention is not limited thereto. The terminals 20 may be held by the housing 30 by means of insert-molding.

As understood from FIG. 1, in the present embodiment, the terminals 20 are arranged in two rows. In other words, the connector 10 is provided with two terminal rows 22 and 24, and each of the terminal rows 22 and 24 has some of the terminals 20. However, the present invention is not limited thereto. The connector 10 may have only one terminal row. In a case where the number of the terminal row is one, another housing different from the housing 30 in shape would be used for holding terminals.

Figure 2:
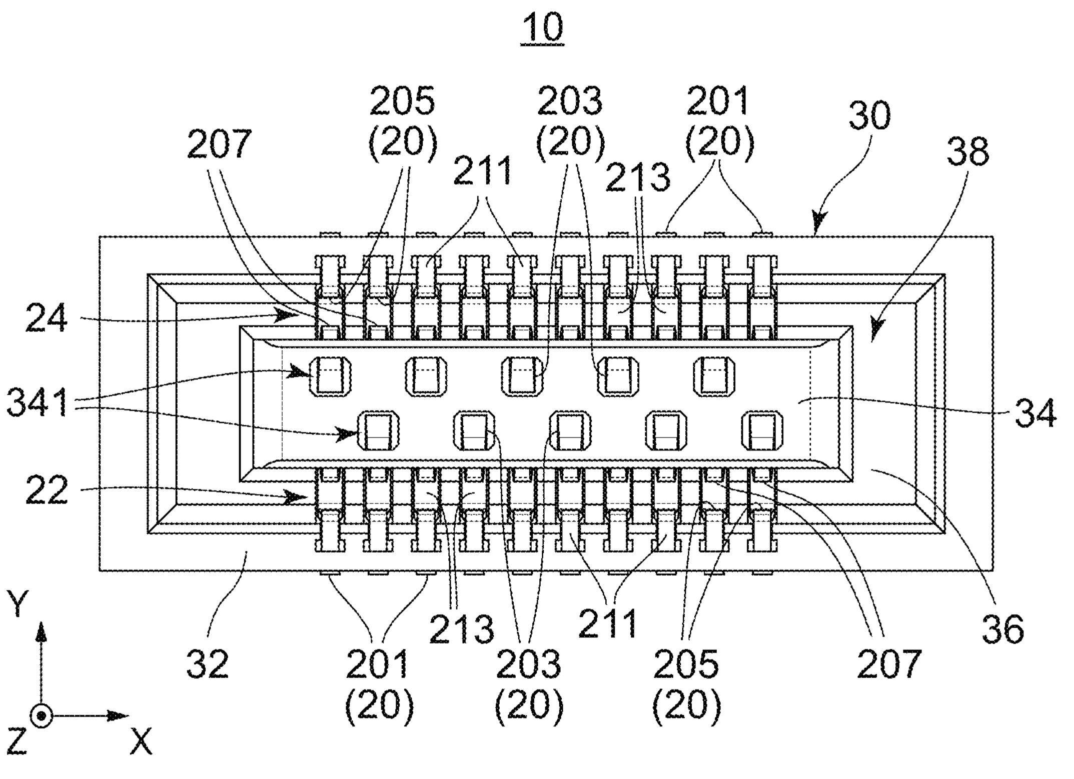
FIG. 2 is a plan view showing the connector of FIG. 1.
Figure 3:
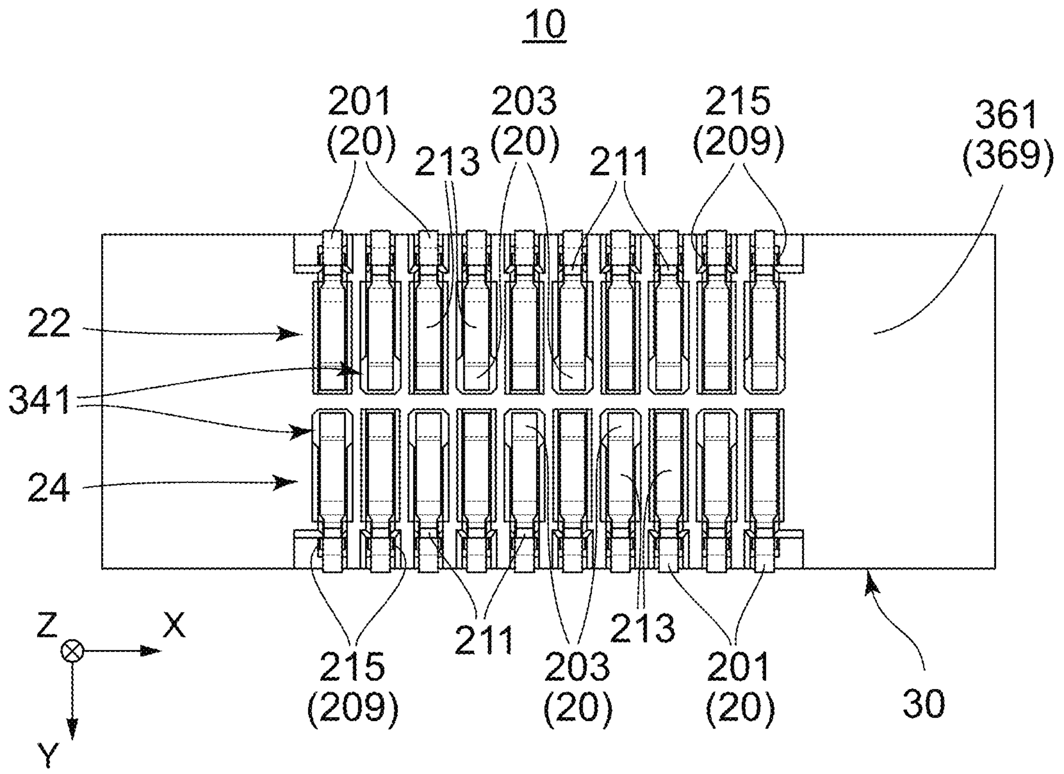
FIG. 3 is a bottom view showing the connector of FIG. 1.

As shown in FIGS. 2 and 3, in each of the terminal rows 22 and 24, the terminals 20 are arranged in a pitch direction. In the present embodiment, the pitch direction is an X-direction. The terminal row 22 and the terminal row 24 are arranged in a width direction perpendicular to the pitch direction. In the present embodiment, the width direction is a Y-direction. In the following description, a positive Y-direction may be referred to as a first width direction, and a negative Y-direction may be referred to as a second width direction.

As understood from FIGS. 2 and 3, the housing 30 has a rectangular shape long in the pitch direction when viewed along an up-down direction perpendicular to both the pitch direction and the width direction. The housing 30 has an external wall portion 32 with a frame shape, an island portion 34 surrounded by the external wall portion 32 and a bottom portion 36 coupling the external wall portion 32 and the island portion 34 with each other. In the present embodiment, the up-down direction is a Z-direction. A positive Z-direction is directed upward while a negative Z-direction is directed downward.

As shown in FIG. 2, the island portion 34 of the housing 30 is provided with a plurality of inspection windows 341. Each of the inspection windows 341 opens upward. In the present embodiment, the inspection windows 341 are formed in two rows to correspond to the terminal rows 22 and 24, respectively. The inspection windows 341 for the terminal row 22 correspond to every other second mount portion 203, which is described later, of the terminals 20 of the terminal row 22. Each of the inspection windows 341 corresponds to any one of the second mount portions 203. Similarly, the inspection windows 341 for the terminal row 24 correspond to every other second mount portion 203, which is described later, of the terminals 20 of the terminal row 24. In addition, the inspection windows 341 for the terminal row 22 and the inspection windows 341 for the terminal row 24 are arranged in staggard arrangement. However, the present invention is not limited thereto. The inspection windows 341 should correspond to at least every other second mount portion 203 of the terminals 20 in each of the terminal rows 22 and 24.

As shown in FIG. 3, the bottom portion 36 of the housing 30 has a bottom surface 361 directed downward. In other words, the housing 30 has the bottom surface 361 directed downward.

As shown in FIGS. 1 and 2, between the external wall portion 32 and the island portion 34, a receiving portion 38 is formed and opens upward. The receiving portion 38 receives a mating connector 50, which is described later, at least in part when the connector 10 and the mating connector 50 are mated with each other.

Figure 4:
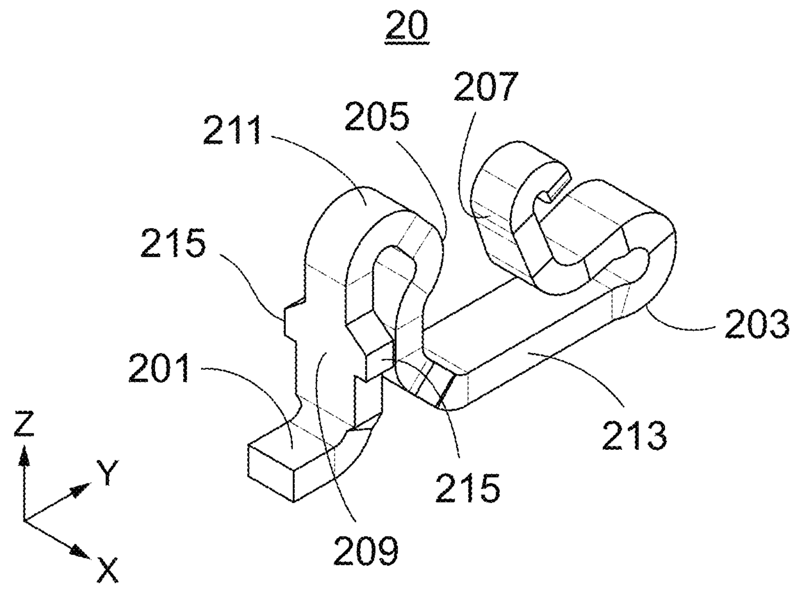
FIG. 4 is a perspective view showing one of terminals included in the connector of FIG. 1.

Referring to FIG. 4, each of the terminals 20 of the terminal row 22 has a first mount portion 201, the second mount portion 203, a first contact portion 205, a second contact portion 207, a held portion 209, a coupling portion 211 and a supporting portion 213. The terminals 20 are formed so that positions of the first mount portion 201, the second mount portion 203, the first contact portion 205 and the second contact portion 207 of each of the terminals 20 are identical with those of any other of the terminals 20 in a plane perpendicular to the pitch direction. In the present embodiment, each of the terminals 20 may be made by punching and bending a sheet metal.

As understood from FIGS. 5, 6, 6A and 6B, each of the terminals 20 of the terminal row 24 is formed so that it has a shape same as those of the terminals 20 of the terminal row 22. However, the terminal 20 of the terminal row 24 is equivalent to the terminal 20 of the terminal row 22 rotated by 180 degrees around an axis extending in the vertical direction.

As shown in FIG. 4, the first mount portion 201 of the terminal 20 extends in the width direction, and one of end portions thereof forms an end of the terminal 20. The held portion 209 extends upward from the other of the end portions of the first mount portion 201. The held portion 209 has two protruding portions 215 which protrude outward in the pitch direction. The coupling portion 211 extends from an upper end of the held portion 209 and is curved so that it extends diagonally downward in the first width direction. The coupling portion 211 supports the first contact portion 205 at an end portion thereof. In the present embodiment, the first contact portion 205 is a part of the coupling portion 211. The supporting portion 213 extends diagonally downward in the second width direction from the first contact portion 205 and is bent so that it extends in the first width direction. The supporting portion 213 is further bent in the second width direction and extends diagonally upward in the second width direction. In addition, the supporting portion 213 is bent so that it extends diagonally downward in the first width direction. The second mount portion 203 is formed in a part of the supporting portion 213. In other words, the second mount portion 203 is a part of the supporting portion 213. In the present embodiment, the second contact portion 207 is supported by the supporting portion 213. In detail, the second contact portion 207 is a part of the supporting portion 213. Thus, the supporting portion 213 extends from the first contact portion 205 and supports the second contact portion 207. In the present embodiment, the second contact portion 207 is located between the second mount portion 203 and the first contact portion 205 in the width direction.

As understood from FIG. 4, the second contact portion 207 faces the first contact portion 205 in the width direction. The supporting portion 213 is resiliently deformable at least in part. By using the resilient deformation of the supporting portion 213, the second contact portion 207 is movable at least in the width direction.

As shown in FIGS. 5, 6, 6A, 6B, 7, 7A and 7B, the connector 10 is mounted on a substrate 80 so that it forms a part of a device. In other words, the device is provided with the connector 10 and the substrate 80. When the connector 10 is mounted on the substrate 80, either the first mount portion 201 or the second mount portion 203 of the terminal 20 is selectively fixed to the substrate 80. In order to make this possible, the first mount portion 201 and the second mount portion 203 protrude downward from the bottom surface 361 of the housing 30 in the up-down direction. In particular, the second mount portion 203 protrudes as a lowest part of the supporting portion 213. Additionally, the second mount portion 203 is located apart from the first mount portion 201 in the width direction.

As understood from FIGS. 5, 6, 6A, 6B, 7, 7A and 7B, in mounting of the connector 10 on the substrate 80, the first mount portion 201 of one of the two terminals 20 adjacent to each other in the pitch direction is soldered to one of pads 801 on the substrate 80. Moreover, the second mount portion 203 of the other of the two terminals 20 adjacent to each other in the pitch direction is soldered to another one of the pads 801 on the substrate 80. In this manner, the first mount portions 201 and the second mount portions 203 of the terminals 20 arranged in the pitch direction are alternately fixed to the pads 801 on the substrate 80 by using solder 82. In other words, for each of the terminal rows 22 and 24, the first mount portions 201 and the second mount portions 203 of the terminals 20 are alternately fixed to the pads 801 on the substrate 80 by using the solder 82. In order to cope with this, on the substrate 80, the pads 801 are arranged in staggered arrangement. The pads 801 correspond to the terminals 20 respectively. In detail, each of the pads 801 corresponds to only one of the first mount portion 201 and the second mount portion 203 of the terminal 20 corresponding thereto. And, on each of the pads 801, one of the first mount portion 201 and the second mount portion 203 of the terminal 20 corresponding thereto is fixed.

Figure 5:
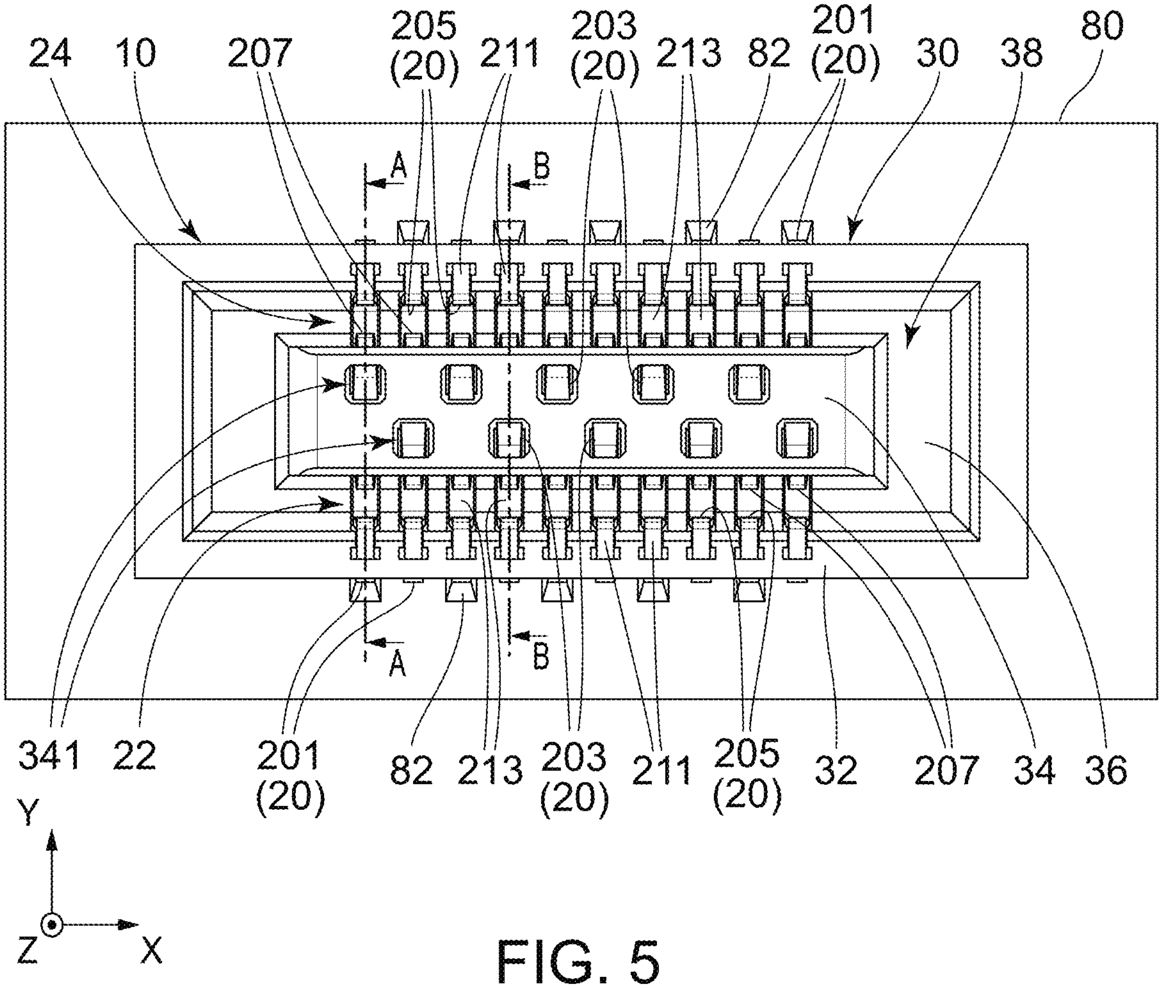
FIG. 5 is a plan view showing a device which is provided with the connector of FIG. 1 and a substrate. The connector is mounted on the substrate.
Figure 6:
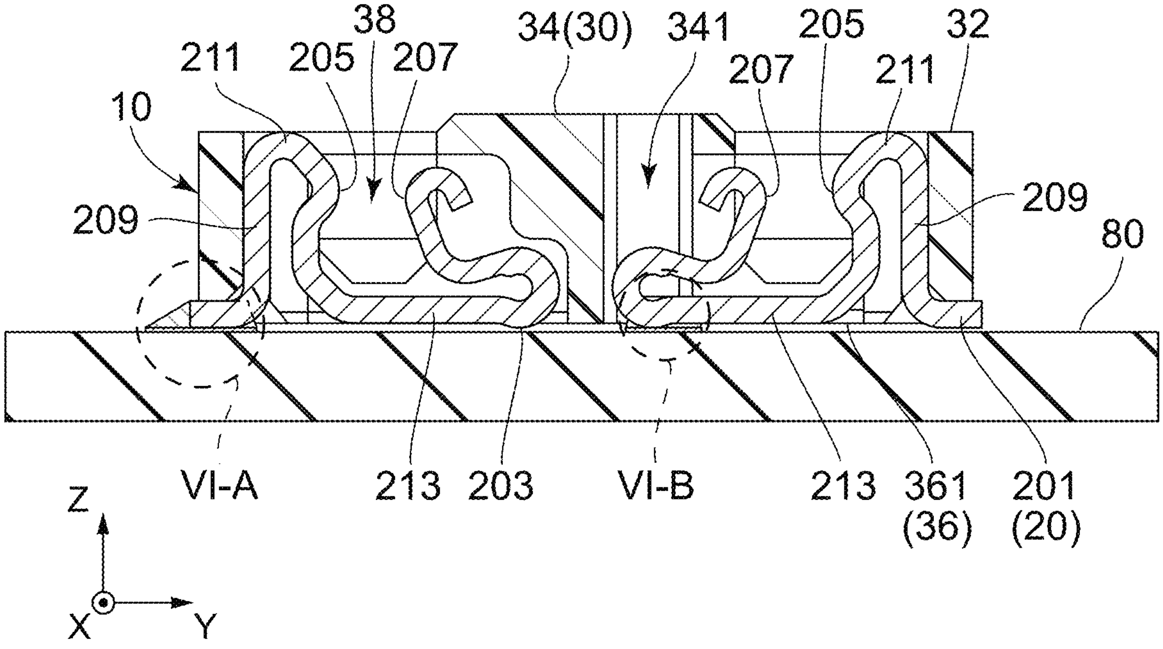
FIG. 6 is a cross-sectional view showing the device of FIG. 5, taken along line A-A.
Figure 6A:
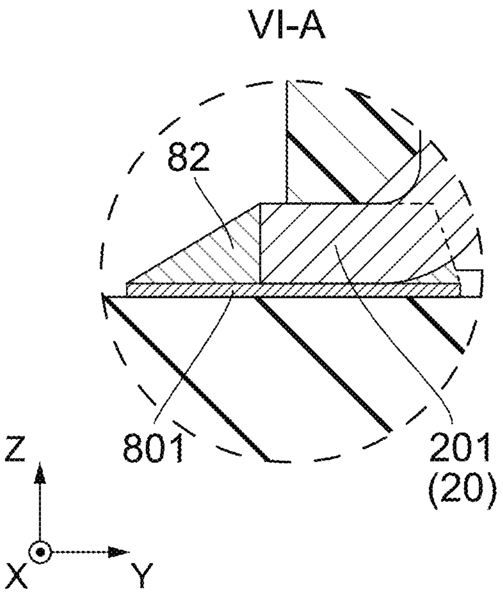
FIG. 6A shows, in an enlarged fashion, a first mount portion shown in FIG. 6 and the vicinity thereof.
Figure 6B:
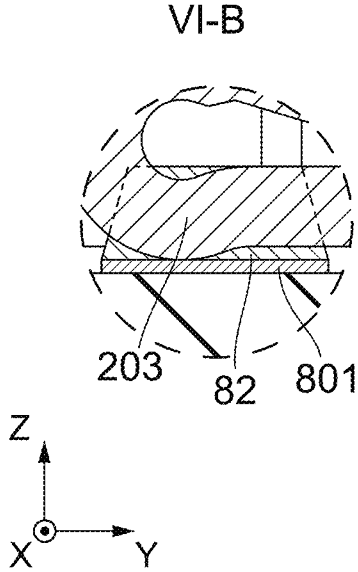
FIG. 6B shows, in an enlarged fashion, a second mount portion shown in FIG. 6 and the vicinity thereof.
Figure 7:
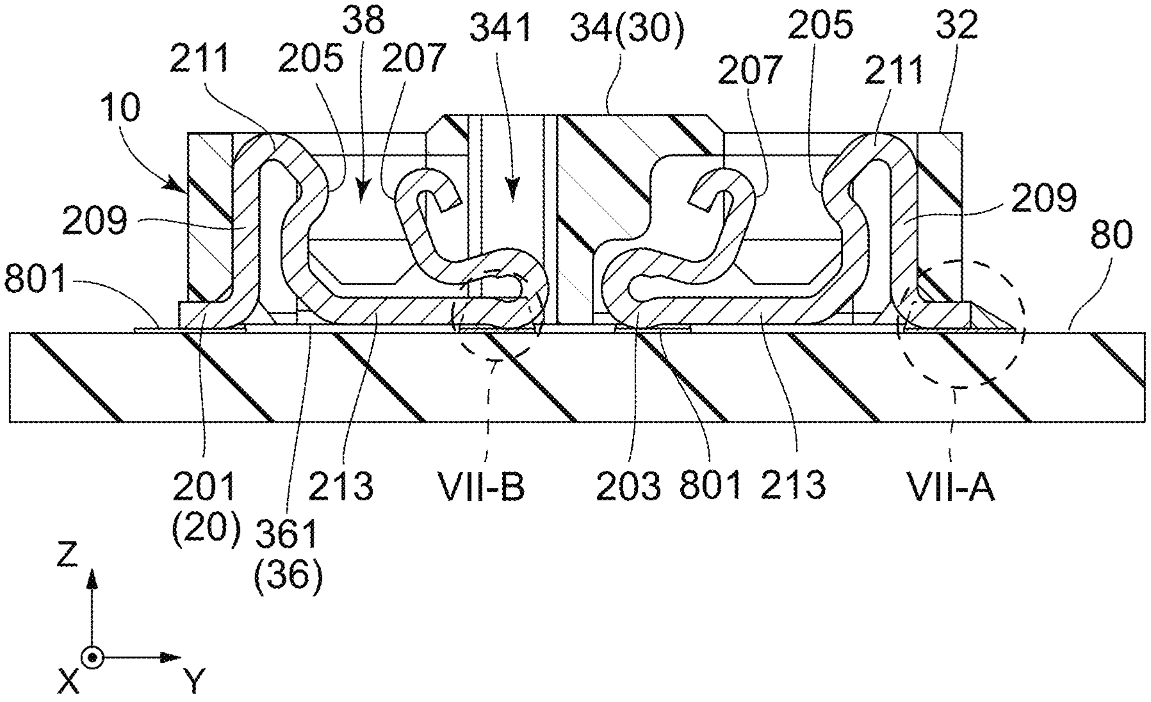
FIG. 7 is another cross-sectional view showing the device of FIG. 5, taken along line B-B.
Figure 7A:
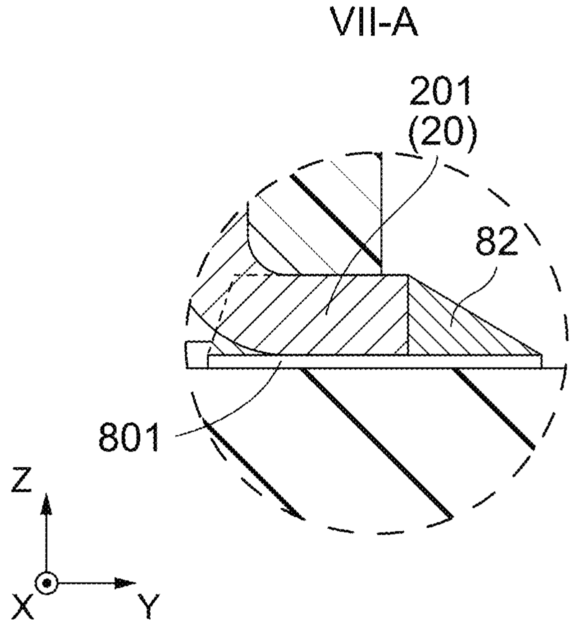
FIG. 7A shows, in an enlarged fashion, a first mount portion shown in FIG. 7 and the vicinity thereof.
Figure 7B:
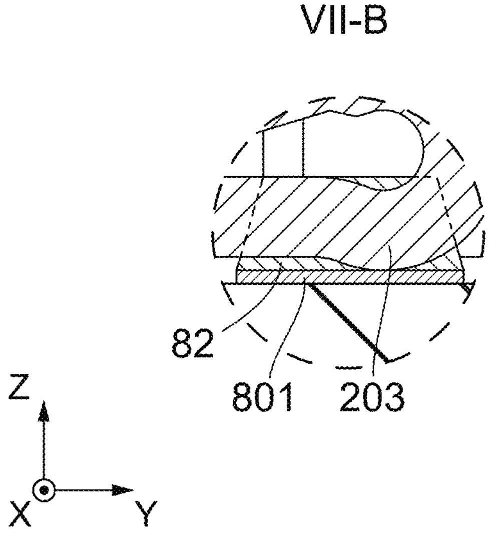
FIG. 7B shows, in an enlarged fashion, a second mount portion shown in FIG. 7 and the vicinity thereof.

As understood from FIG. 5, in the present embodiment, a configuration of the terminals 20 of one of the terminal rows 22 and 24 and a configuration of the terminals 20 of a remaining one of the terminal rows 22 and 24 are arranged in rotation symmetry about an axis passing through the middle of the terminal rows 22 and 24 along the up-down direction. On the other hand, the configuration of the terminals 20 of one of the terminal rows 22 and 24 and the configuration of the terminals 20 of the remaining one of the terminal rows 22 and 24 are not arranged in line symmetry about a line parallel to the pitch direction and passing through the middle of the terminal rows 22 and 24. With this arrangement, only one of the two terminals 20 adjacent to each other in the width direction is fixed to the substrate 80 by using the second mount portion 203 thereof. In other words, both of two of the second mount portions 203 which are closest to each other are not soldered simultaneously and it can reduce or eliminate possibility of short circuit caused by the solder 82.

As understood from FIG. 5, when the connector 10 is mounted on the substrate 80, fixing of the first mount portions 201 and the second mount portions 203 on the substrate 80 is visible from above in the up-down direction. In detail, in the present embodiment, each of the first mount portions 201 is outside of the housing 30 in the width direction. Accordingly, the fixing of the first mount portion 201 on the substrate 80 is visible from above or diagonally above the substrate 80. Moreover, in the present embodiment, the inspection windows 341 corresponding to the second mount portions 203 fixed to the substrate 80, respectively, are formed in the housing 30. Accordingly, the fixing of the second mount portions 203 to the substrate 80 is visible through the inspection windows 341 corresponding to them, respectively, with keeping strength of the housing 30.

As described above, in the present embodiment, the pads 801 on the substrate 80 are arranged in staggered arrangement. Accordingly, in the pitch direction, it is unnecessary to leave a space between the pads 801 adjacent to each other. In fact, in the pitch direction, it is possible to arrange the pads 801 adjacent to each to overlap with each other. Therefore, in the pitch direction, pitches of the pads 801 can be reduced. Thus, restriction derived from the pads 801 is eased, and it is possible to reduce a distance between the two terminals 20 adjacent to each other in the pitch direction in the connector 10. This contributes to small-sizing the connector 10 and increasing the number of the terminals 20.

In addition, in the present embodiment, positions of the first contact portion 205 and the second contact portion 207 of each of the terminals 20 in each of the terminal rows 22 and 24 are identical with those of any other of the terminals 20. With this structure, it is easy to control an insertion and extraction force of the connector 10 with respect to the mating connector 50. Accordingly, restriction derived from the insertion and extraction force is eased when intending to increase the number of the terminals 20 of the connector 10. Moreover, setting the insertion and extraction force to a minimum allows abrasion of the terminals 20 to be suppressed, and thereby high connection reliability can be obtained.

Figure 8:
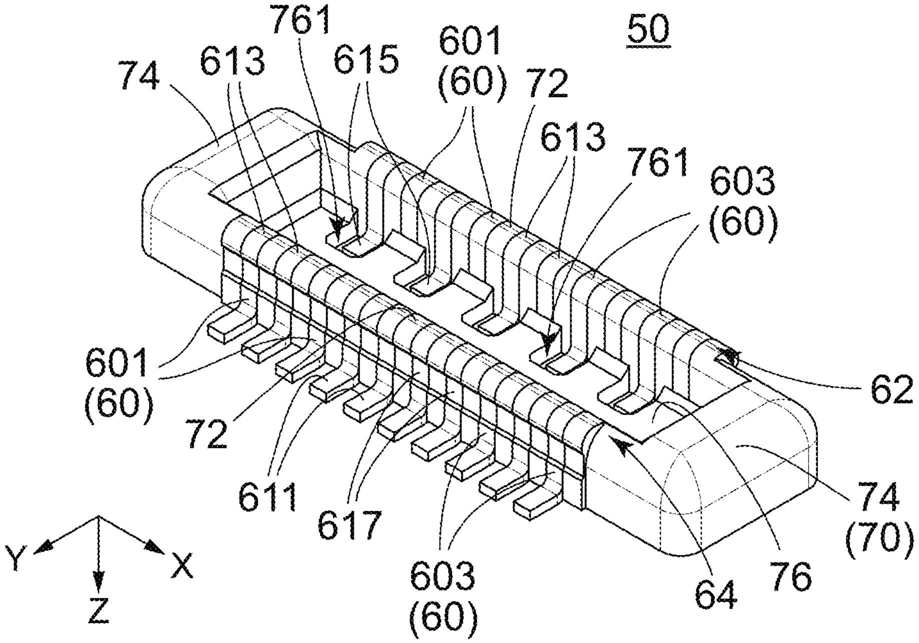
FIG. 8 is a perspective view showing a mating connector mateable with the connector of FIG. 1. The mating connector is upside down.

Referring to FIG. 8, the mating connector 50 is provided with a plurality of mating terminals 60 and a mating housing 70 which holds the mating terminals 60. The mating connector 50 is formed so that it is mateable with the connector 10 in the up-down direction. In the present embodiment, each of the mating terminals 60 is formed of a sheet metal, and the mating housing 70 is made of insulating resin. In the present embodiment, the mating terminals 60 are held by the mating housing 70 by insert-molding. However, the present invention is not limited thereto. The mating terminals 60 may be held by the mating housing 70 by press-fitting.

Figure 9:
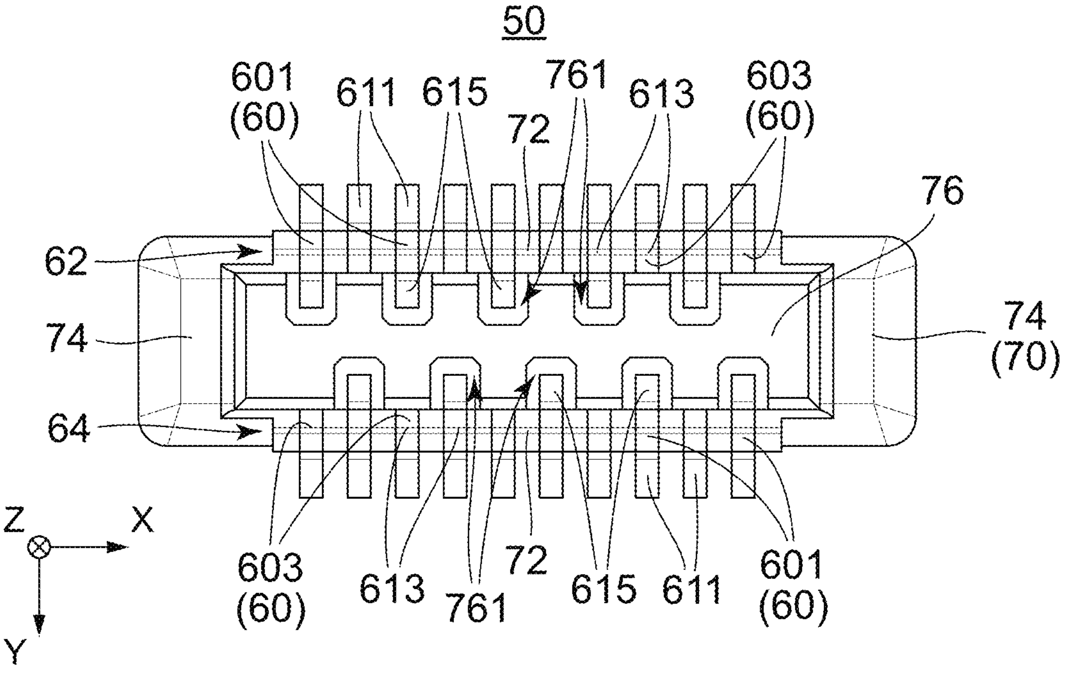
FIG. 9 is a bottom view showing the mating connector of FIG. 8.
Figure 10:
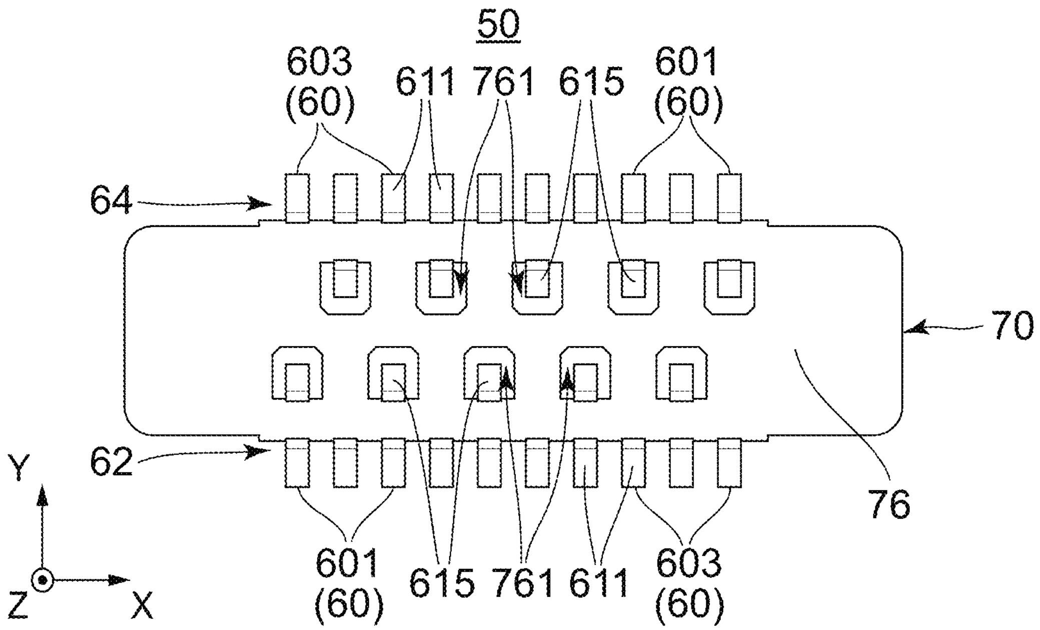
FIG. 10 is a plan view showing the mating connector of FIG. 8.

As shown in FIGS. 9 and 10, the mating housing 70 has a rectangular shape long in the pitch direction when viewed along the up-down direction. Moreover, the mating housing 70 has a pair of long walls 72, short walls 74 coupling the long walls 72 to each other and an upper portion 76. The upper portion 76 of the mating housing 70 is provided with mating inspection windows 761 corresponding to second mating mount portions 615 mentioned later, respectively.

As shown in FIGS. 9 and 10, the mating terminals 60 are arranged into two rows so that they correspond to the long walls 72 and form mating terminal rows 62 and 64. In each of the mating terminal rows 62 and 64, the mating terminals 60 are arranged in the pitch direction. The mating terminals 60 correspond to the terminals 20 of the connector 10, respectively. When the mating connector 50 and the connector 10 are mated with each other, each of the mating terminals 60 is brought into contact with the terminal 20 corresponding thereto.

Figure 11:
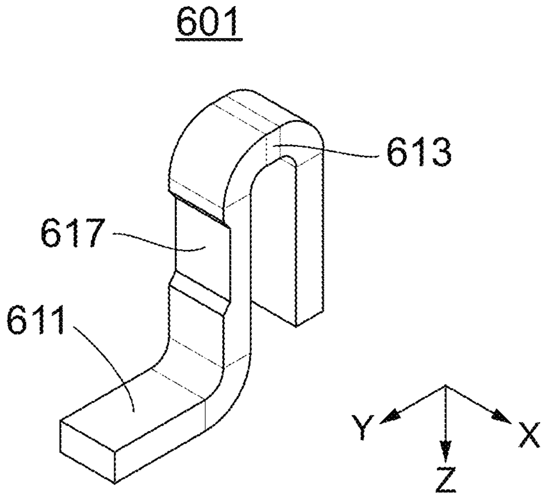
FIG. 11 is a perspective view showing one of first mating terminals included in the mating connector of FIG. 8.
Figure 12:
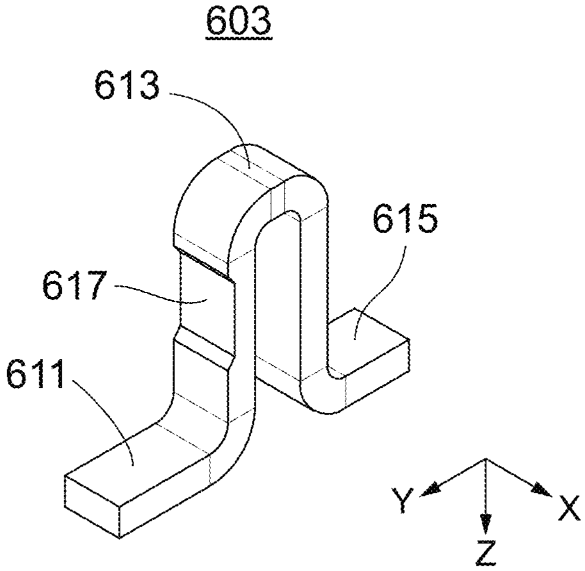
FIG. 12 is a perspective view showing one of second mating terminals included in the mating connector of FIG. 8.
Figure 13:
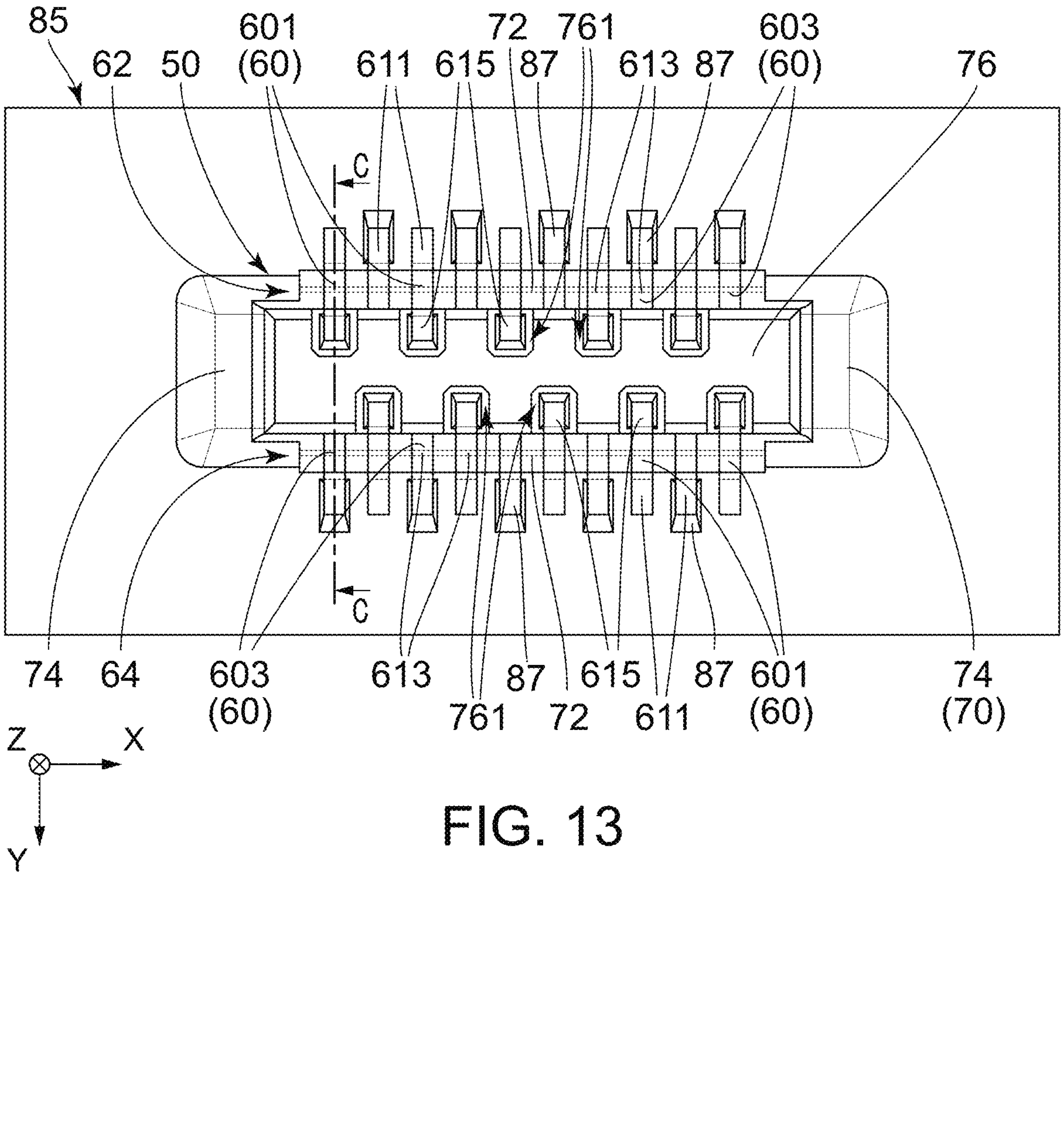
FIG. 13 is a bottom view showing a mating device which is provided with the mating connector of FIG. 8 and a mating substrate. The mating device is mounted on the mating substrate.
Figure 14:
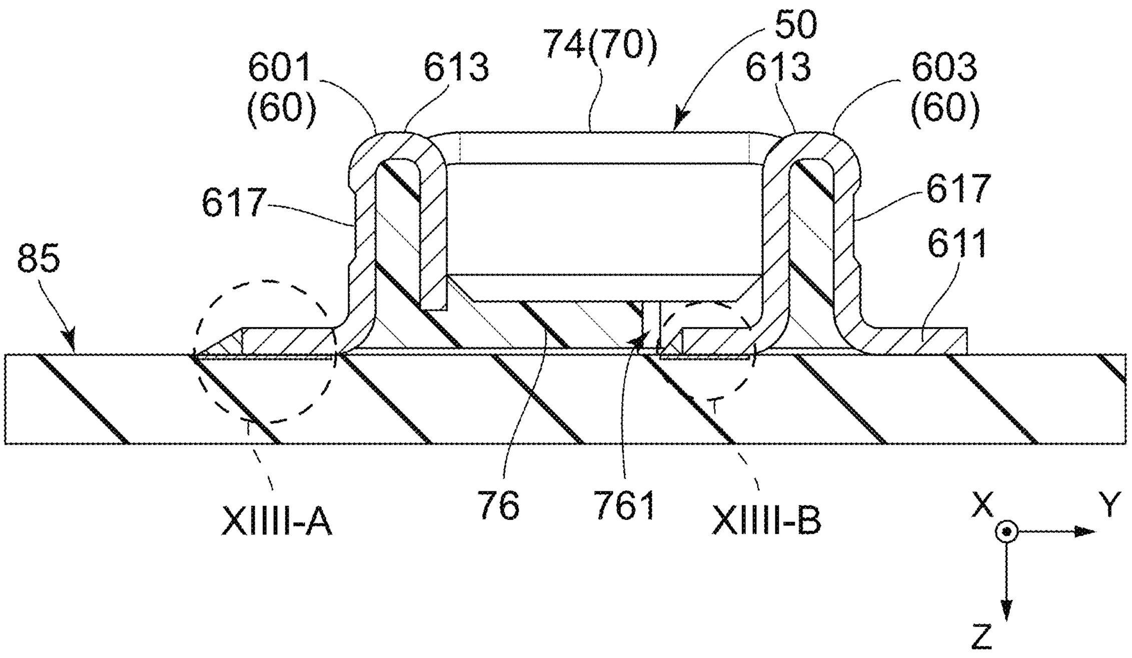
FIG. 14 is a cross-sectional view showing the mating device of FIG. 13, taken along line C-C.
Figure 14A:
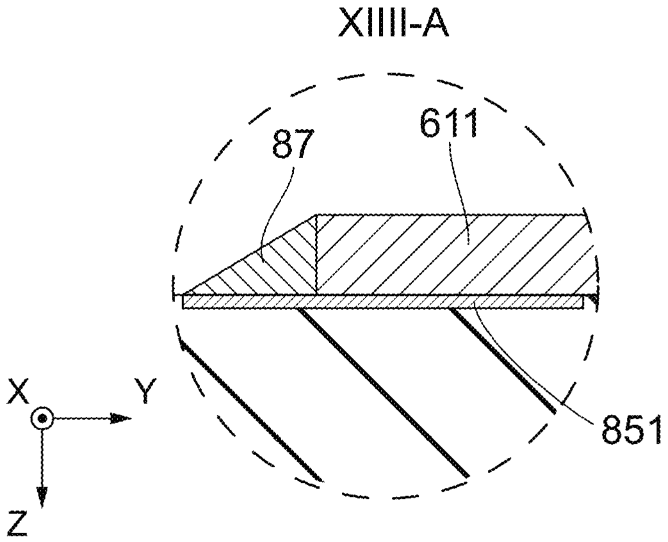
FIG. 14A shows, in an enlarged fashion, a first mating mount portion shown in FIG. 14 and the vicinity thereof.
Figure 14B:
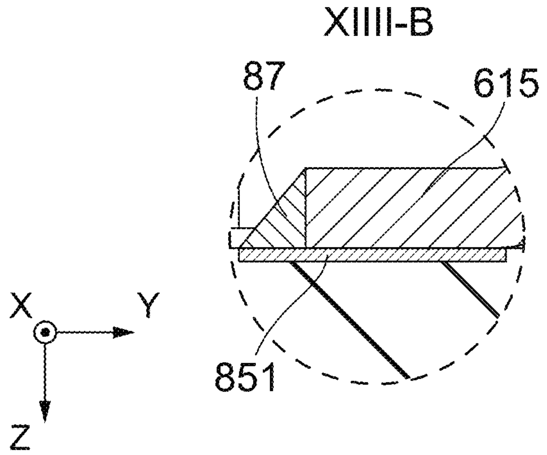
FIG. 14B shows, in an enlarged fashion, a second mating mount portion shown in FIG. 14 and the vicinity thereof.

As shown in FIGS. 11 and 12, the mating terminals 60 include two types of mating terminals 601 and 603 which are different from each other in shape, i.e., first mating terminals 601 (see FIG. 11) and second mating terminals 603 (see FIG. 12). As shown in FIG. 11, the first mating terminal 601 has a first mating mount portion 611 and a U-shaped portion 613. As shown in FIG. 12, the second mating terminal 603 has a first mating mount portion 611, a U-shaped portion 613 and a second mating mount portion 615. However, the present invention is not limited thereto. The second mating terminal 603 may not have the first mating mount portion 611.

As understood from FIGS. 9 and 10, each of the mating terminal rows 62 and 64 is formed by arranging the first mating terminals 601 and the second mating terminals 603 alternately. In other words, one of the two mating terminals 60 adjacent to each other in the pitch direction is the first mating terminal 601, and a remaining one of them is the second mating terminal 603. Accordingly, one of the two mating terminals 60 adjacent to each other in the pitch direction has the first mating mount portion 611, and the remaining one of them has the second mating mount portion 615. Moreover, one of the two mating terminals 60 adjacent to each other in the pitch direction does not have the second mating mount portion 615. In addition, in each of the mating terminal rows 62 and 64, the first mating mount portions 611 and the second mating mount portions 615 are apart from each other in the width direction.

As shown in FIGS. 11 and 12, each of the mating terminals 60 has a mating lock portion 617 which is formed in the U-shaped portion 613. The mating lock portion 617 is dented in the pitch direction. Thus, the mating connector 50 has the mating lock portion 617. As understood from FIG. 8, in each of the mating terminal rows 62 and 64, a position of the mating lock portion 617 of each of the mating terminals 60 is identical with that of any other of the mating terminals 60 in a plane perpendicular to the pitch direction.

As shown in FIGS. 13, 14, 14A and 14B, the mating connector 50 is mounted on a mating substrate 85 to form a part of a mating device. In other words, the mating device is provided with at least the mating connector 50 and the mating substrate 85. When the mating connector 50 is mounted on the mating substrate 85, the first mating terminals 601 are fixed to the mating substrate 85 by using the first mating mount portions 611 while the second mating terminals 603 are fixed to the mating substrate 85 by using the second mating mount portions 615. In order to achieve this, a plurality of mating pads 851 are arranged in a staggered arrangement on the mating substrate 85. The mating pads 851 on the mating substrate 85 correspond to the mating terminals 60, respectively. To each of the mating pads 851, the first mating mount portion 611 or the second mating mount portion 615 of the mating terminal 60 corresponding thereto is fixed by using solder 87. Thus, the first mating mount portions 611 and the second mating mount portions 615 of the mating terminals 60 arranged in the pitch direction are fixed to the mating pads 851, alternately.

As understood from FIGS. 13, 14, 14A and 14B, when the mating connector 50 is mounted on the mating substrate 85, fixing of the first mating mount portions 611 and the second mating mount portions 615 to the mating substrate 85 is visible from beneath. In detail, in the present embodiment, the first mating mount portions 611 are outside of the mating housing 70. Accordingly, the fixing of the first mating mount portions 611 to the mating substrate 85 is visible from beneath the mating substrate 85. Moreover, in the present embodiment, the upper portion 76 of the mating housing 70 is provided with the mating inspection windows 761 corresponding to the second mating mount portions 615, respectively. Accordingly, the fixing of the second mating mount portions 615 to the mating substrate 85 is visible through the mating inspection windows 761 with keeping strength of the mating housing 70.

Figure 15:
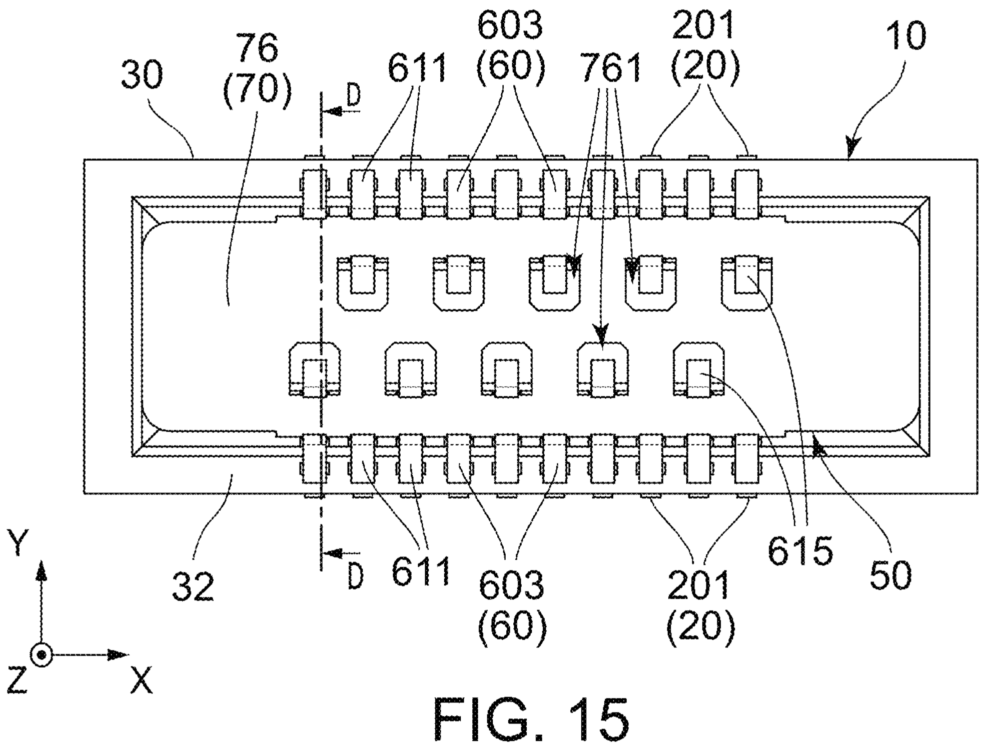
FIG. 15 is a plan view showing the connector of FIG. 1 and the mating connector of FIG. 8. The connector and the mating connector are mated with each other.
Figure 16:
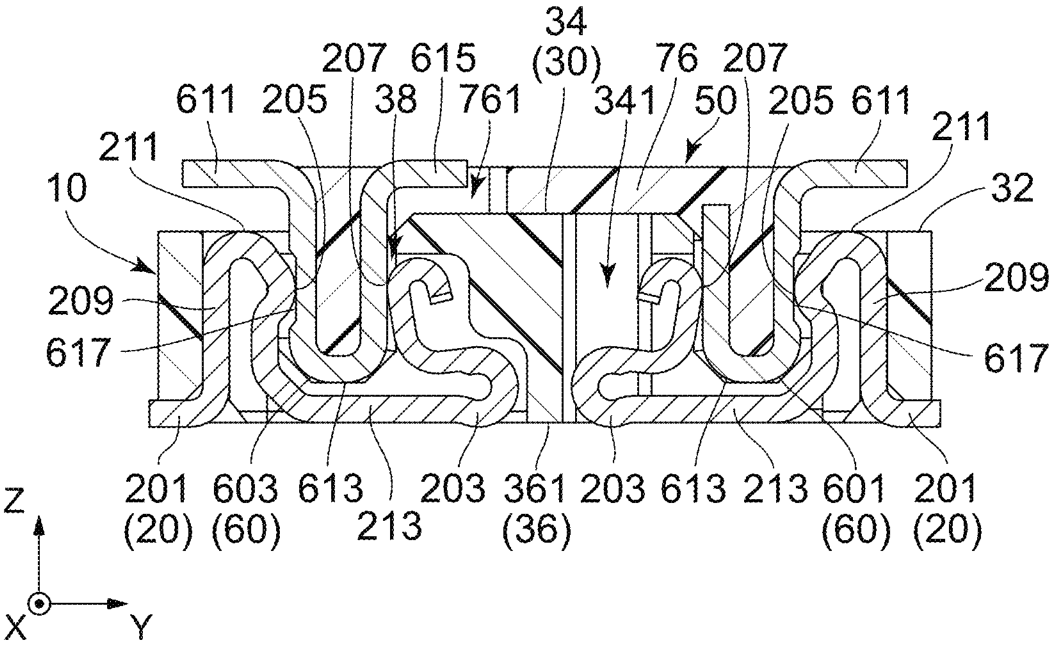
FIG. 16 is a cross-sectional view showing the connector and the mating connector of FIG. 15, taken along line D-D.

As shown in FIGS. 15 and 16, when the connector 10 and the mating connector 50 are mated with each other, the mating connector 50 is received by the receiving portion 38 of the connector 10 in part. At this time, the U-shaped portion 613 of each of the mating terminals 60 is inserted into between the first contact portion 205 and the second contact portion 207 of the terminal 20 corresponding to the mating terminal 60. The second contact portion 207 is movable in the width direction due to resilient deformation of the supporting portion 213 and allows entering of the U-shaped portion 613. As a result, each of the terminals 20 and the mating terminal 60 corresponding thereto are brought into contact with and are electrically connected to each other. At this time, the first contact portion 205 enters the mating lock portion 617 at least in part. In a mated state that the connector 10 and the mating connector 50 are mated with each other, the first contact portion 205 serves as a lock portion which locks the mated state together with the mating lock portion 617.

In the mating connector 50 of the present embodiment, similarly to the connector 10, a distance between the two mating terminals 60 adjacent to each other in the pitch direction can be reduced.

Second Embodiment

Figure 17:
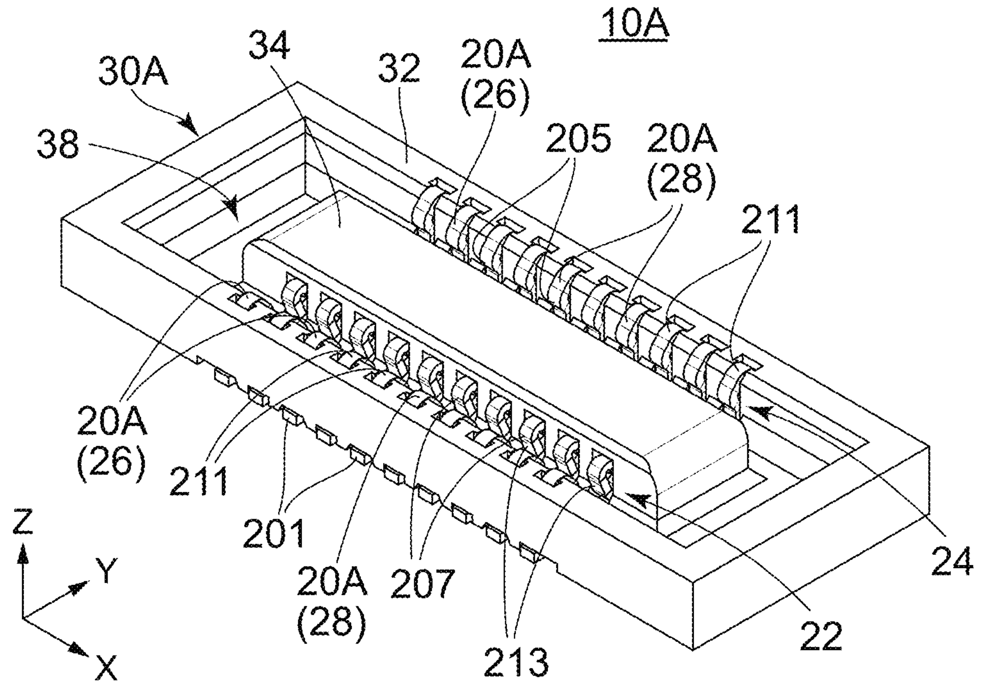
FIG. 17 is a perspective view showing a connector according to a second embodiment of the present invention.
Figure 18:
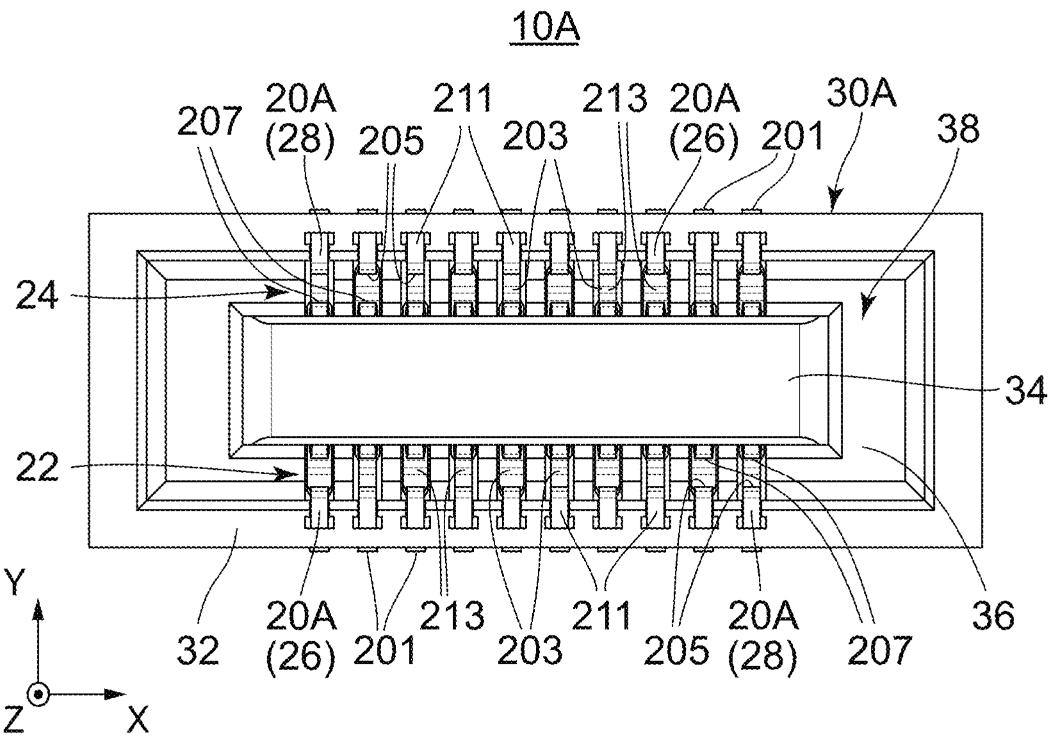
FIG. 18 is a plan view showing the connector of FIG. 17.
Figure 19:
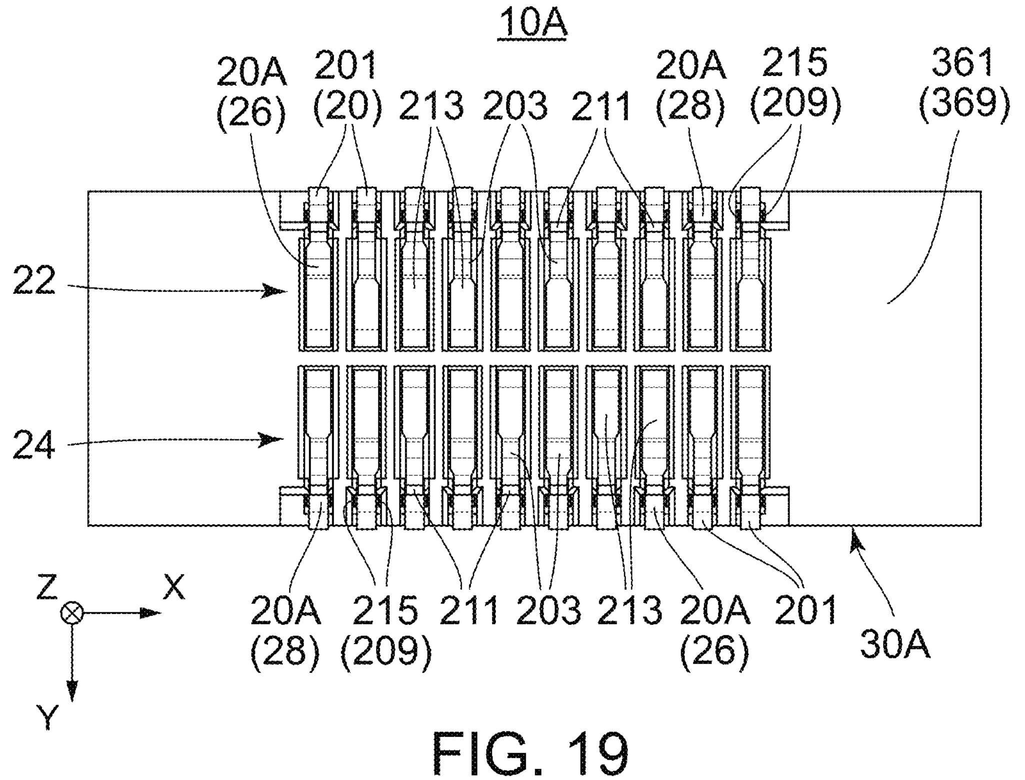
FIG. 19 is a bottom view showing the connector of FIG. 17.

Referring to FIGS. 17 to 19, a connector 10A according to a second embodiment of the present invention is provided with a plurality of terminals 20A and a housing 30A which holds the terminals 20A. The connector 10 of the present embodiment is formed so that it is same as the connector 10 of the first embodiment except for the following points.

As shown in FIGS. 17 to 19, the housing 30A does not have the inspection windows 341 (see FIG. 1). Regarding other points except for this, the housing 30A is same as the housing 30 of the first embodiment.

Figure 20:
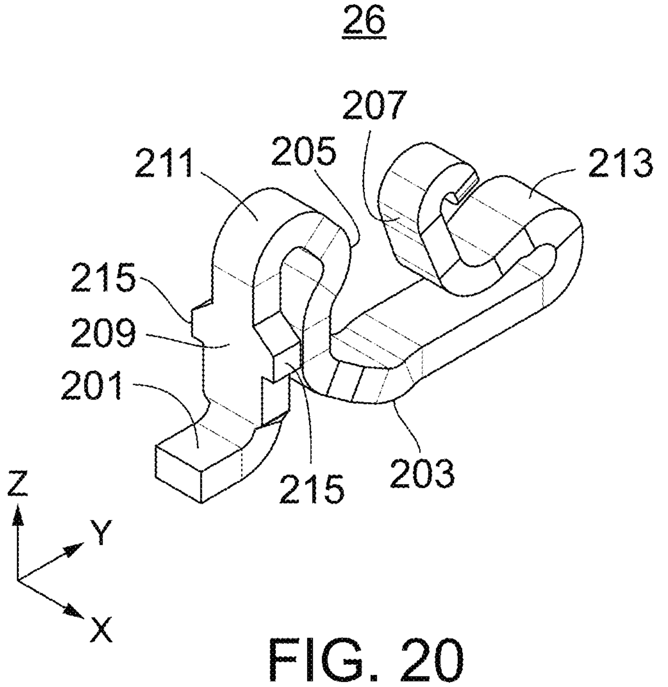
FIG. 20 is a perspective view showing one of first terminals included in the connector of FIG. 17.
Figure 21:
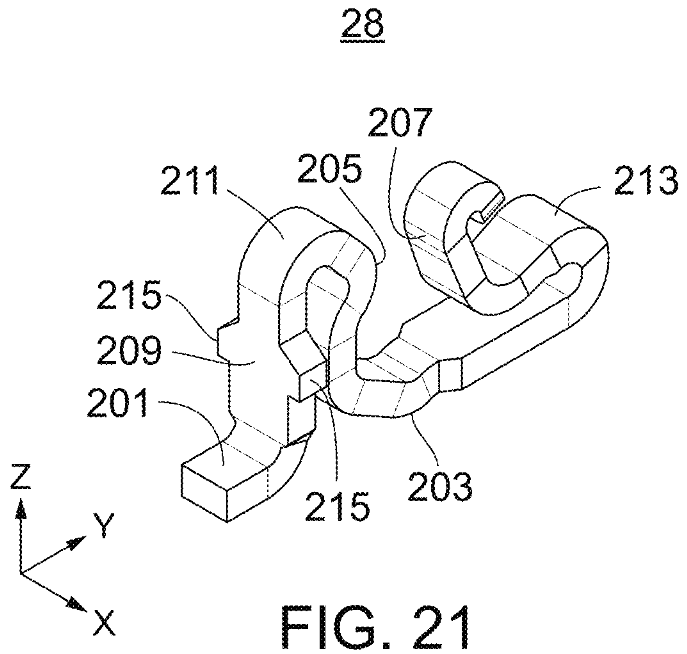
FIG. 21 is a perspective view showing one of second terminals included in the connector of FIG. 17.

As shown in FIGS. 20 and 21, the terminals 20A include two types of terminals 26 and 28 which are different from each other in shape, i.e., first terminals 26 and second terminals 28.

As understood from comparing FIG. 20 with FIG. 4, the first terminal 26 has a shape almost same as that of the terminal 20 of the first embodiment. However, a position of a second mount portion 203 of the first terminal 26 is different from that of the second mount portion 203 of the terminal 20 of the first embodiment. In detail, the position of the second mount portion 203 of the first terminal 26 is nearer to a first contact portion 205 of the first terminal 26 in comparison with the position of the second mount portion 203 of the terminal 20 of the first embodiment with respect to the first contact portion 205 of the terminal 20. In the present embodiment, the second mount portion 203 is located between the first contact portion 205 and a second contact portion 207 in the width direction.

As understood from comparing FIG. 21 with FIG. 20, the second terminal 28 has a shape almost same as that of the first terminal 26. However, the second mount portion 203 of the second terminal 28 is dented in the pitch direction. In other words, in the pitch direction, a size of the second mount portion 203 of the second terminal 28 is smaller than that of the second mount portion 203 of the first terminal 26.

As shown in FIGS. 18 and 19, in each of terminal rows 22 and 24, the first terminals 26 and the second terminals 28 are arranged alternately. In other words, one of the two terminals 20A adjacent to each other is the first terminal 26, and a remaining one of them is the second terminal 28. With this arrangement, the second mount portion 203 of the terminal 20A arranged in one of an odd-numbered position and an even-numbered position is dented in the pitch direction. Nevertheless, in the present embodiment, when each of the terminal rows 22 and 24 is viewed in the pitch direction, all the terminals 20A are identical with one another in shape.

Referring to FIGS. 22, 23, 23A, 23B, 24, 24A and 24B, when the connector 10A is mounted on a substrate 80A, a first mount portion 201 of each of the first terminals 26 is fixed to the substrate 80A while the second mount portion 203 of each of the second terminals 28 is fixed to the substrate 80A. Since the second mount portion 203 of the second terminal 28 is dented in the pitch direction, a space is secured for receiving a fillet of solder 82 used for fixing.

As understood from FIGS. 22, 23, 23A, 23B, 24, 24A and 24B, the first mount portions 201 and the second mount portions 203 of the terminals 20A arranged in the pitch direction are fixed to the substrate 80A alternately. In order to achieve this, a plurality of pads 801 is arranged in a staggered arrangement on the substrate 80A for each of the terminal rows 22 and 24. In the present embodiment, an interval between the pads 801 to which the first mount portions 201 of each of the terminal rows 22 and 24 are fixed and the pads 801 to which the second mount portions 203 of each of the terminal rows 22 and 24 are fixed is narrower than that of the first embodiment. However, the pads 801 are still apart from one another in the width direction. Accordingly, in the pitch direction, a pitch of the pads 801 can be reduced. Therefore, the connector 10A can obtain advantages similar to those of the connector 10 of the first embodiment.

Figure 22:
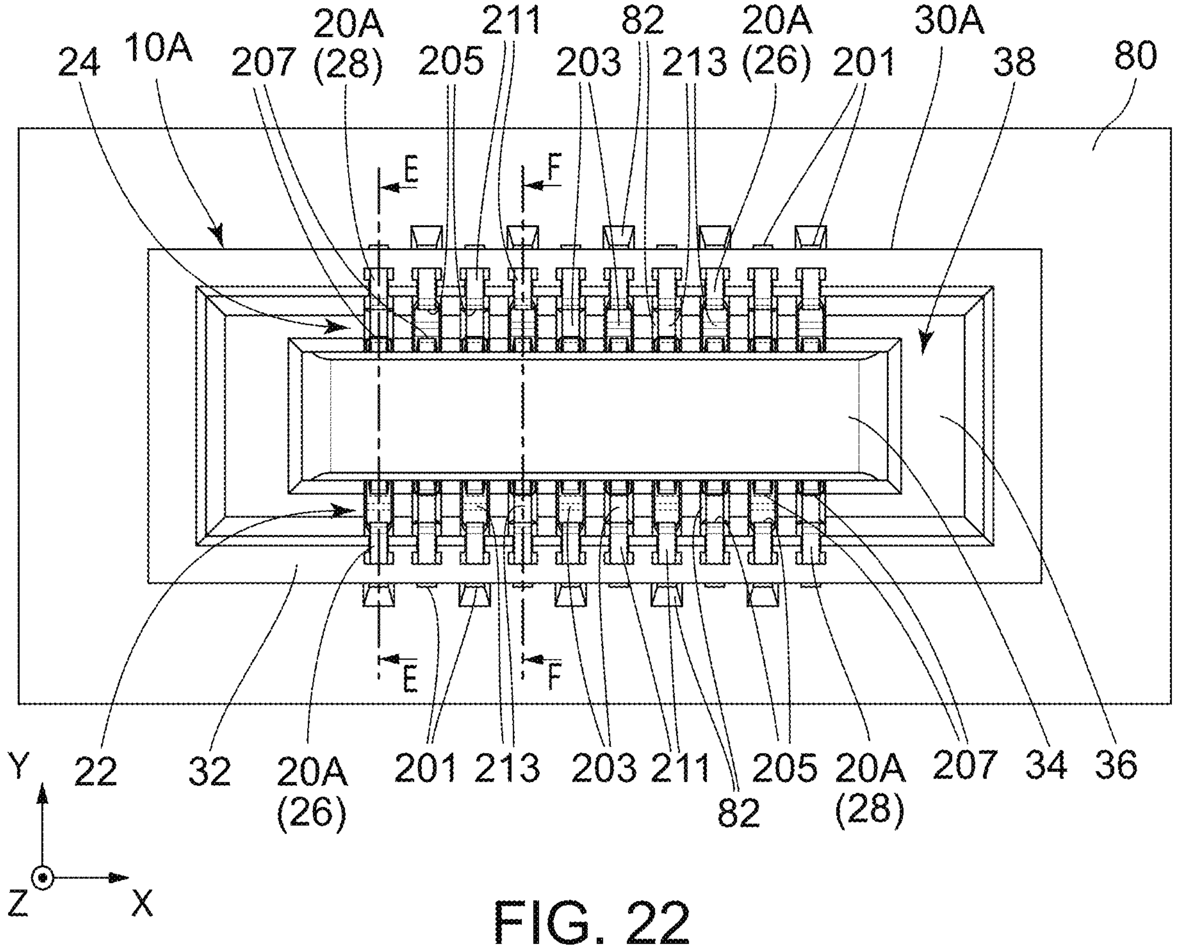
FIG. 22 is a plan view showing a device which is provided with the connector of FIG. 17 and a substrate. The connector is mounted on the substrate.
Figure 23:
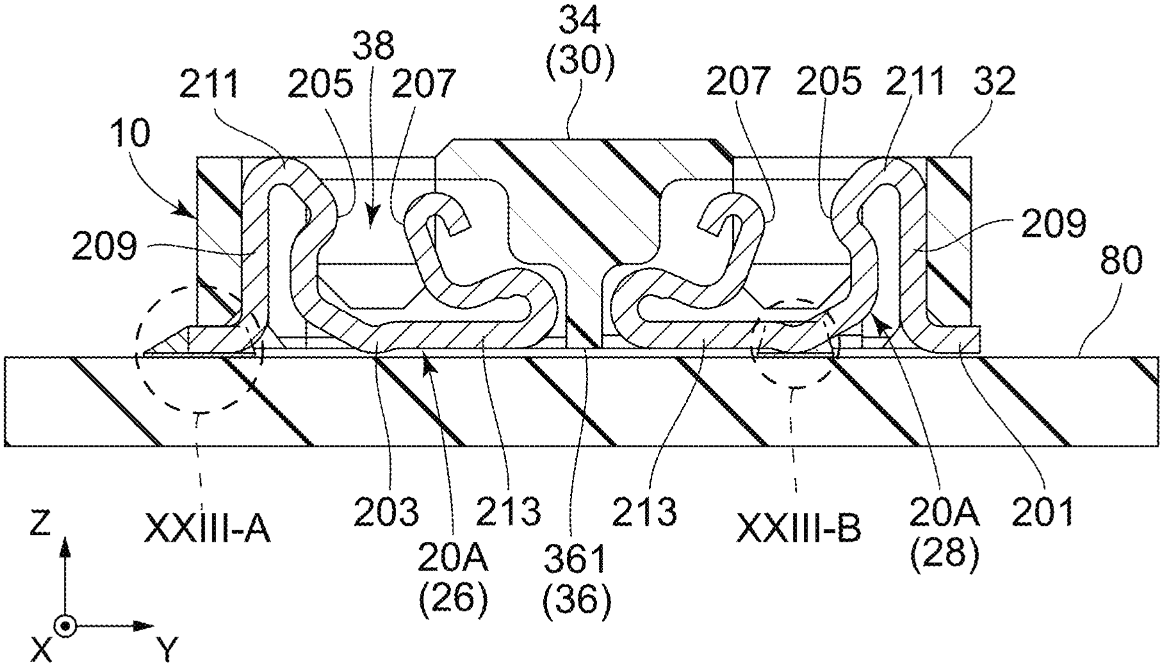
FIG. 23 is a cross-sectional view showing the device of FIG. 22, taken along line E-E.
Figure 23A:
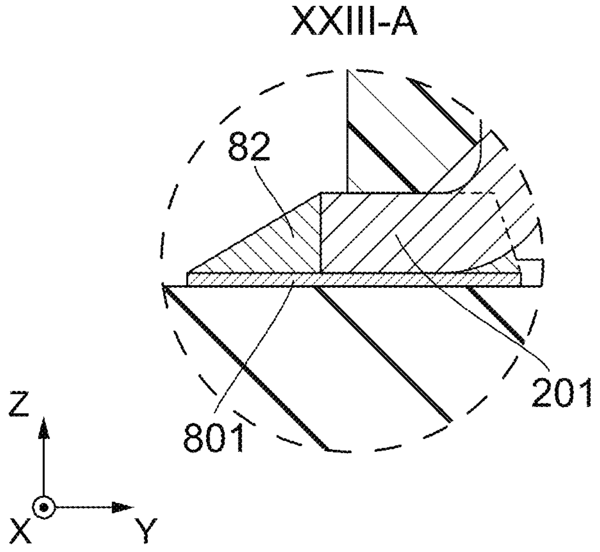
FIG. 23A shows, in an enlarged fashion, a first mount portion shown in FIG. 23 and the vicinity thereof.
Figure 23B:
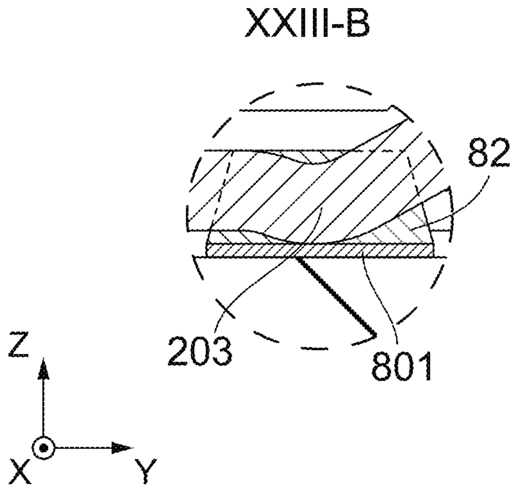
FIG. 23B shows, in an enlarged fashion, a second mount portion shown in FIG. 23 and the vicinity thereof.
Figure 24:
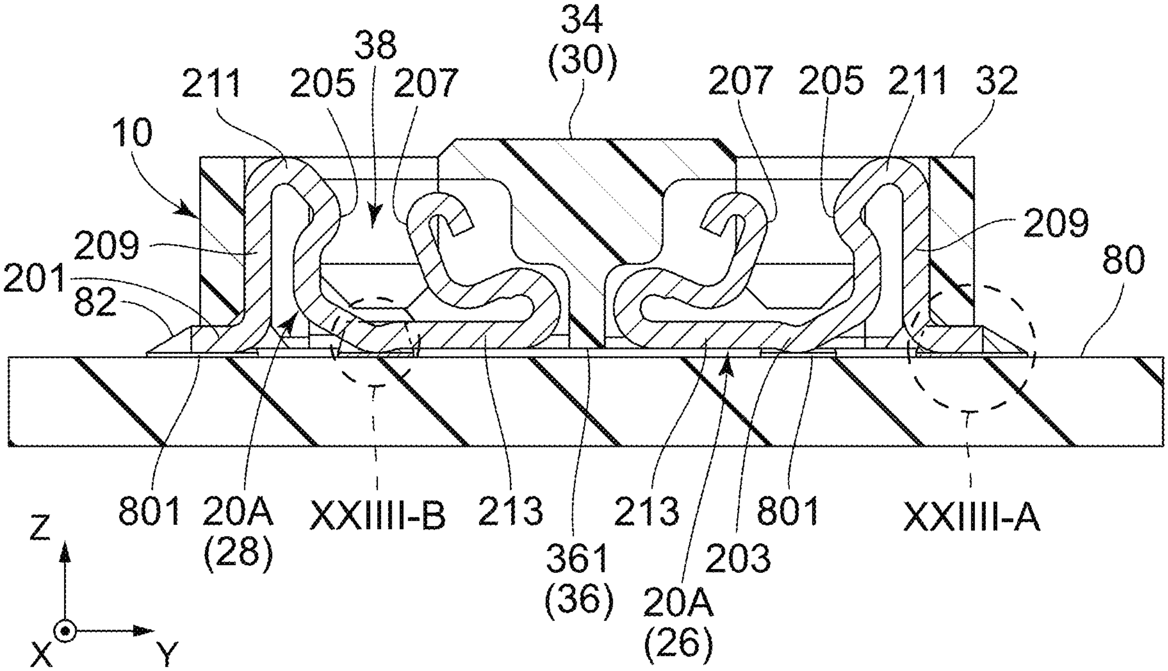
FIG. 24 is another cross-sectional view showing the device of FIG. 22, taken along line F-F.
Figure 24A:
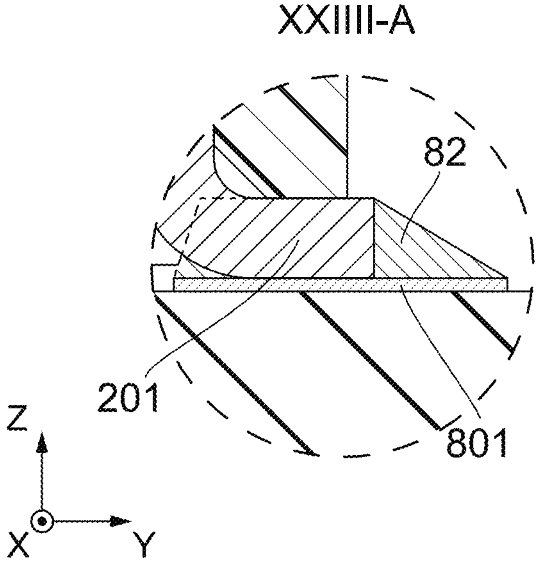
FIG. 24A shows, in an enlarged fashion, a first mount portion shown in FIG. 24 and the vicinity thereof.
Figure 24B:
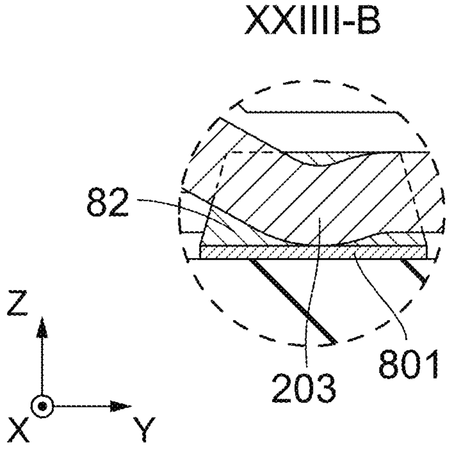
FIG. 24B shows, in an enlarged fashion, a second mount portion shown in FIG. 24 and the vicinity thereof.

As understood from FIG. 22, the first mount portions 201 of the terminals 20A are outside of the housing 30A. Accordingly, fixing of the first mount portions 201 to the substrate 80A is visible from above. Moreover, the second mount portions 203 of the terminals 20A are exposed in a receiving portion 38 of the housing 30A. Accordingly, fixing of the second mount portions 203 to the substrate 80A is visible from above.

Although the specific explanation about the present invention is made above with reference to the embodiments, the present invention is not limited thereto but susceptible of various modifications and alternative forms without departing from the spirit of the invention.

[First Modification]

Figure 25:
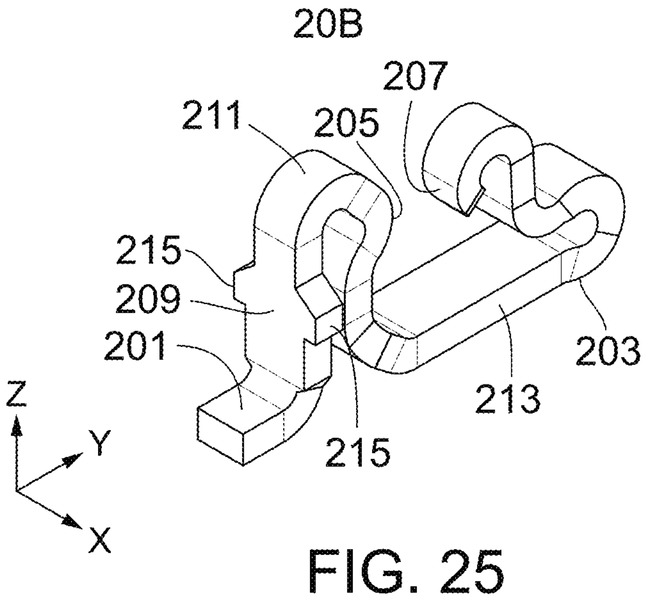
FIG. 25 is a perspective view showing a modified example of the terminal of FIG. 4.

For example, in place of each of the terminals 20 of the connector 10 of the first embodiment, a terminal 20B shown in FIG. 25 may be used. In that case, a shape of the housing 30 may be modified so that it is suitable for the terminals 20B if necessary.

As understood from comparing FIG. 25 with FIG. 4, a shape from a first mount portion 201 to a second mount portion 203 in the terminal 20B is same as that of the terminal 20. As shown in FIG. 25, in the terminal 20B, a supporting portion 213 further extends from the second mount portion 203 and is bent in the second width direction. The supporting portion 213 further extends upward and is bent in the second width direction again, and then is bent diagonally downward in the first direction. A length from the second mount portion 203 to the second contact portion 207 in the supporting portion 213 of the terminal 20B is longer than that of the terminal 20. Accordingly, the supporting portion 213 of the terminal 20B can be more flexible than the supporting portion 213 of the terminal 20. Therefore, in comparison with the connector 10 of the first embodiment, a connector provided with the terminals 20B can more easily control an insertion and extraction force with respect to the mating connector 50 and obtain high connection reliability.

[Second Modification]

Figure 26:
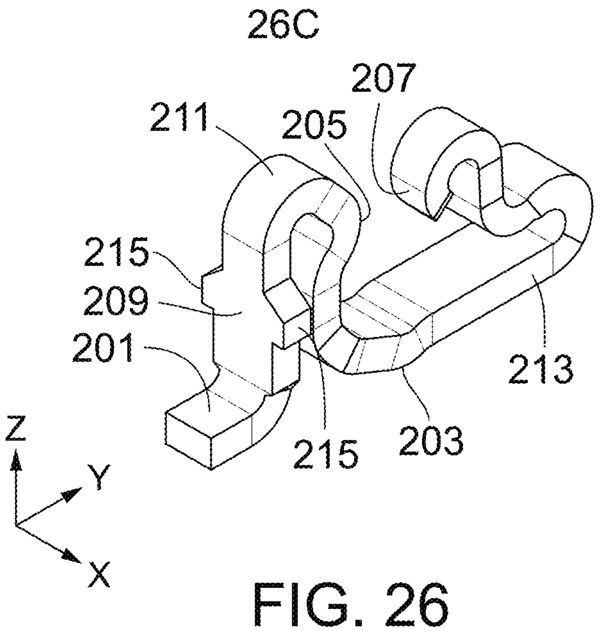
FIG. 26 is a perspective view showing a modified example of the terminal of FIG. 20.
Figure 27:
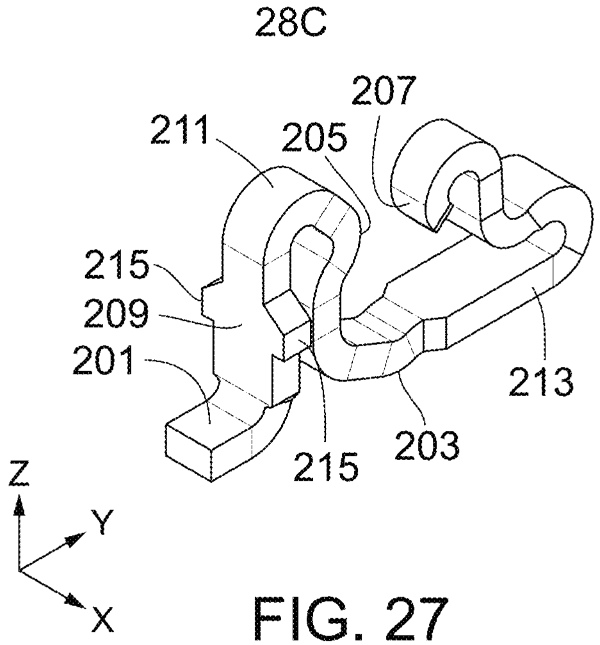
FIG. 27 is a perspective view showing a modified example of the terminal of FIG. 21.
Figure 28:
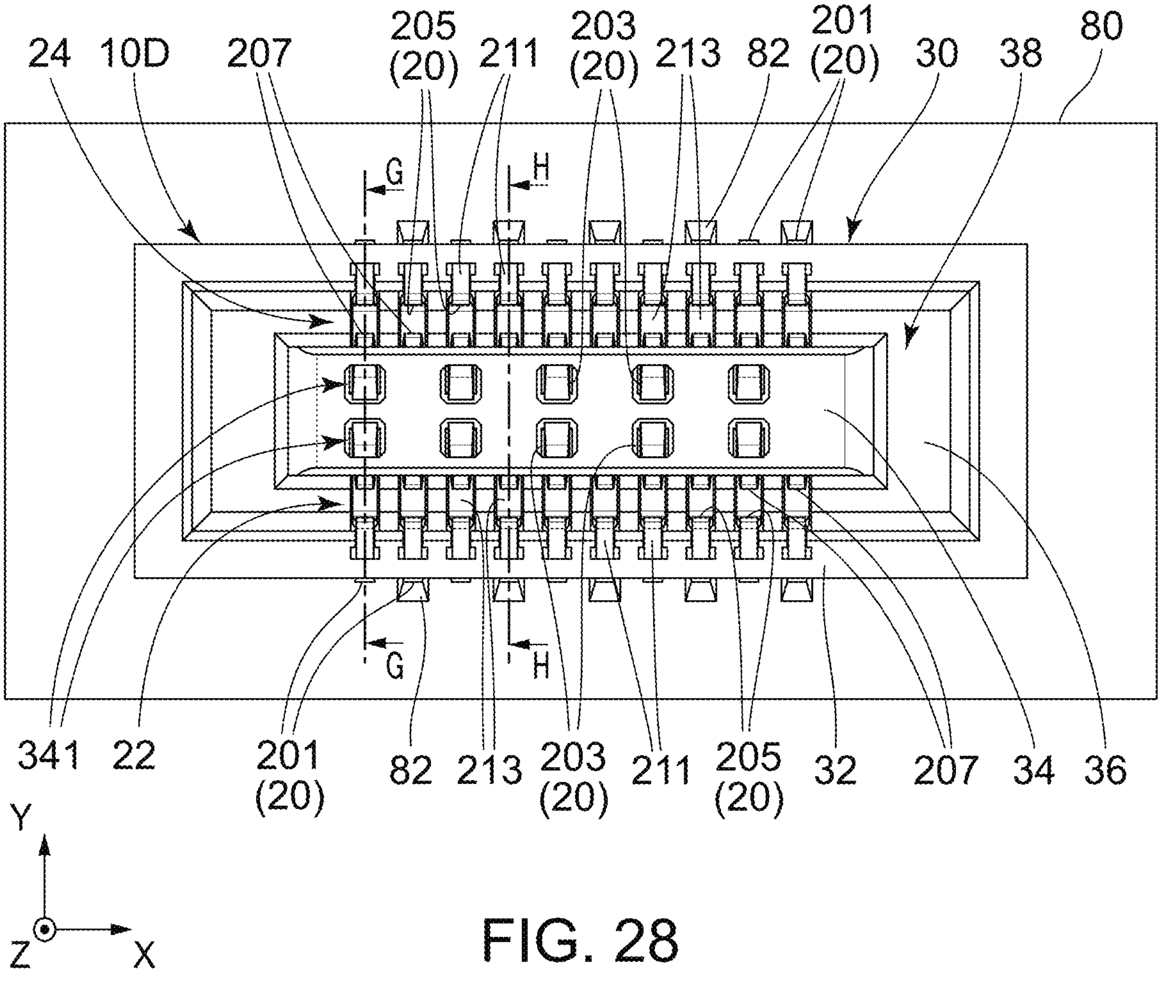
FIG. 28 is a plan view showing a modified example of the device of FIG. 5.
Figure 29:
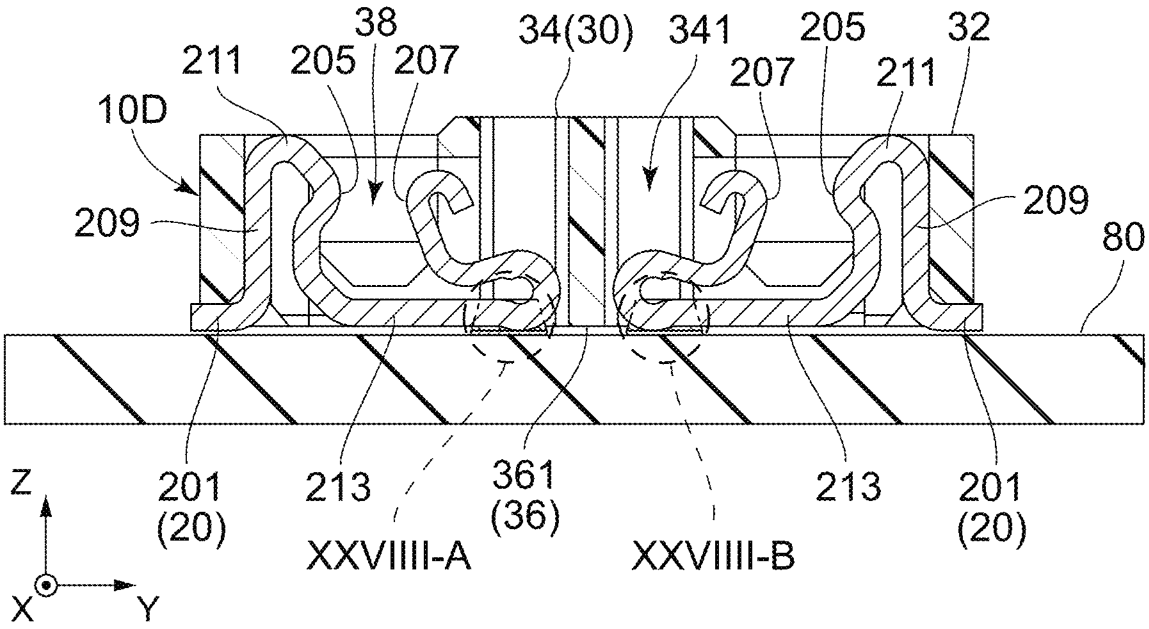
FIG. 29 is a cross-sectional view showing the device of FIG. 28, taken along line G-G.
Figure 29A:
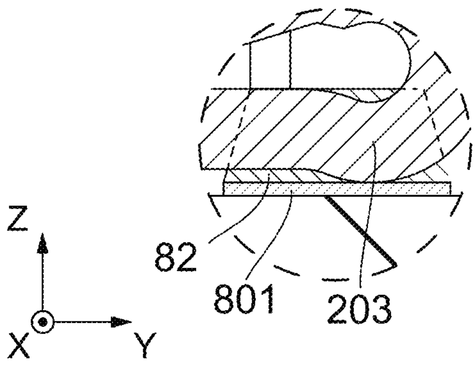
FIG. 29A shows, in an enlarged fashion, a second mount portion shown in FIG. 29 and the vicinity thereof.
Figure 29B:
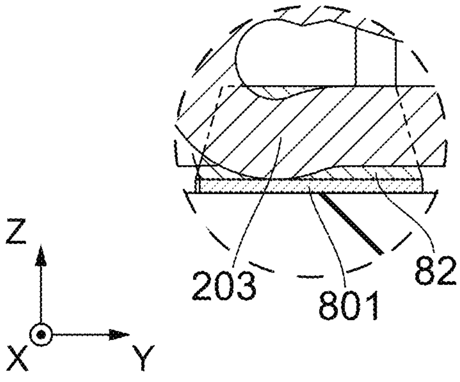
FIG. 29B shows, in an enlarged fashion, another second mount portion shown in FIG. 29 and the vicinity thereof.
Figure 30:
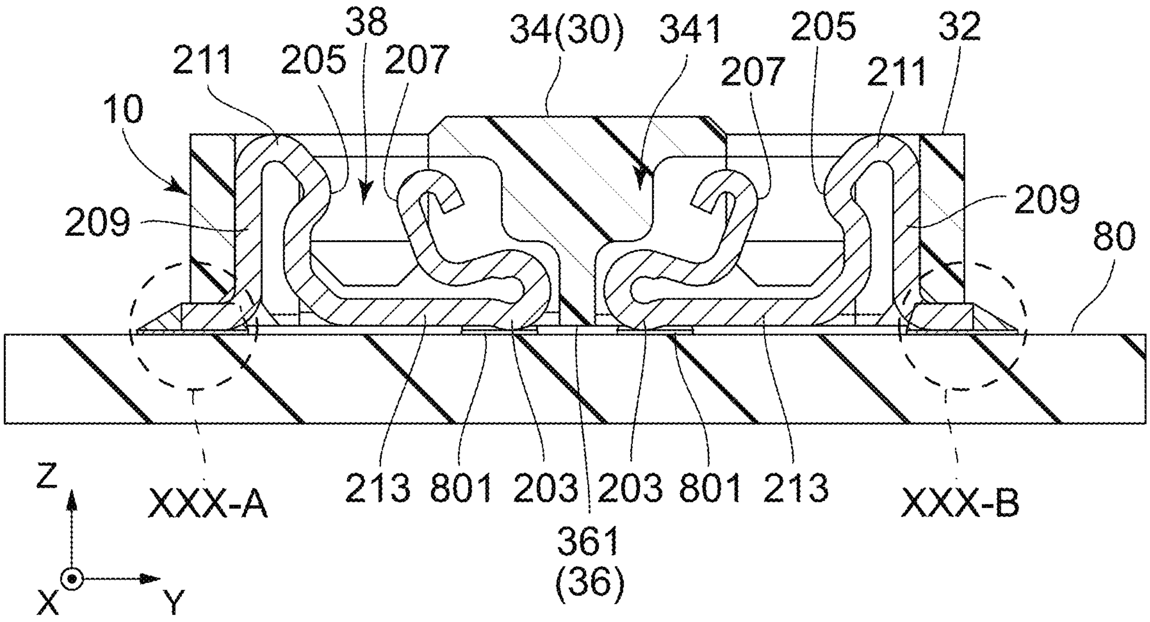
FIG. 30 is another cross-sectional view showing the device of FIG. 28, taken along line H-H.
Figure 30A:
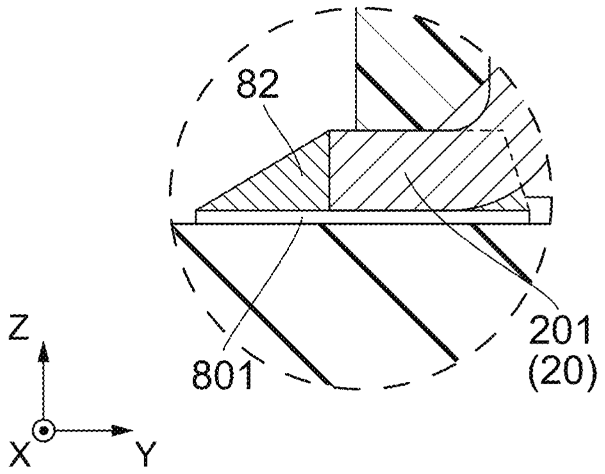
FIG. 30A shows, in an enlarged fashion, a first mount portion shown in FIG. 30 and the vicinity thereof.
Figure 30B:
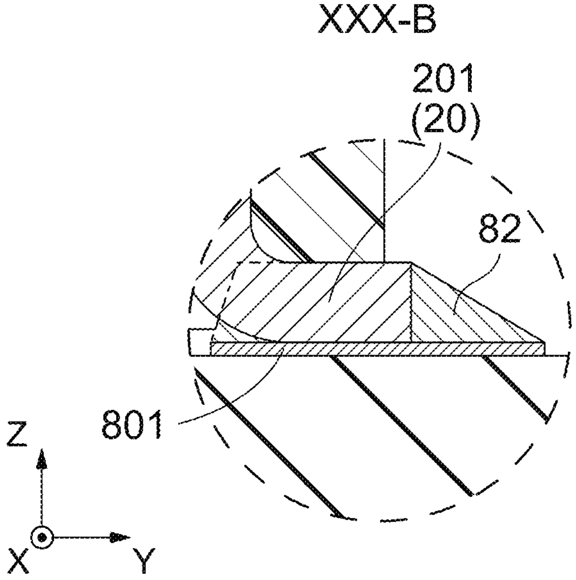
FIG. 30B shows, in an enlarged fashion, another first mount portion shown in FIG. 30 and the vicinity thereof.
Figure 31:
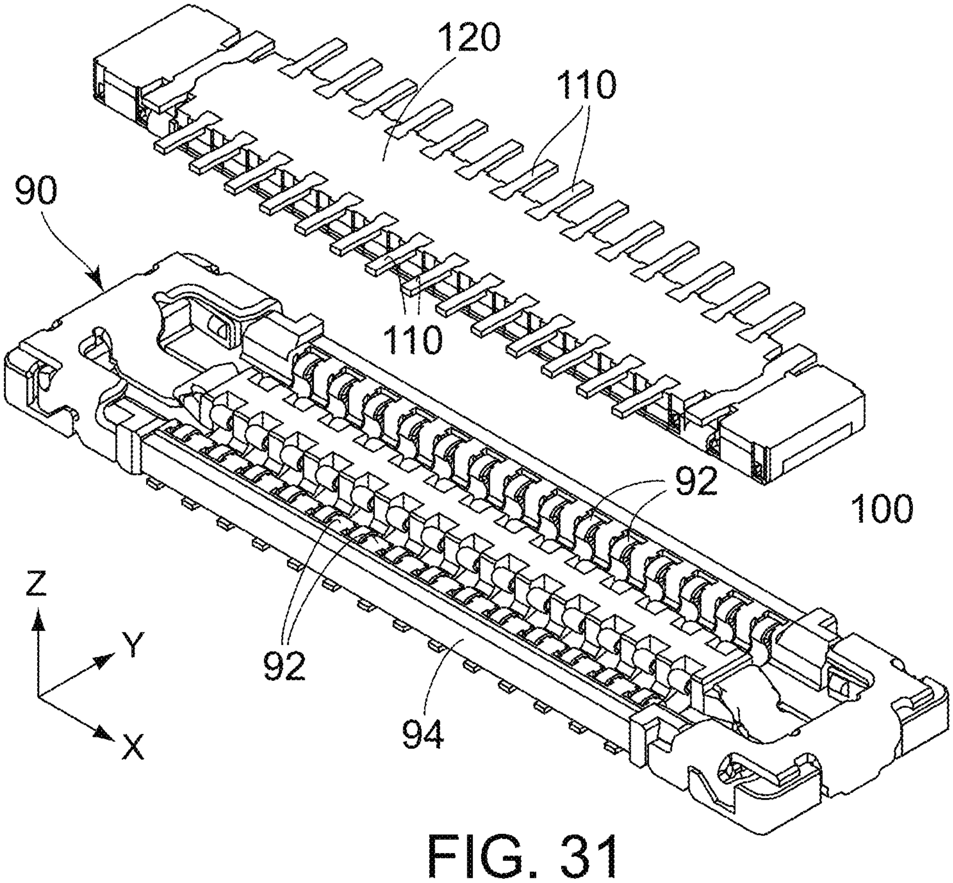
FIG. 31 PRIOR ART
FIG. 31 is a perspective view showing a connector and a mating connector which are disclosed in Patent Document 1.
Figure 31A:
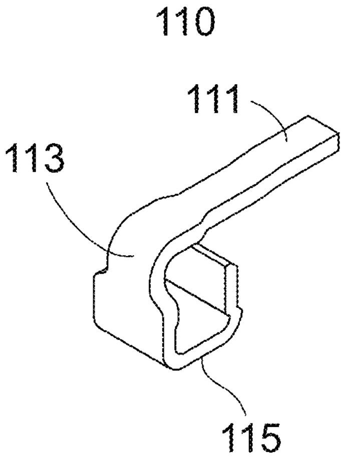
FIG. 31A PRIOR ART
FIG. 31A shows a mating terminal included in the connector of FIG. 31.
Figure 32:
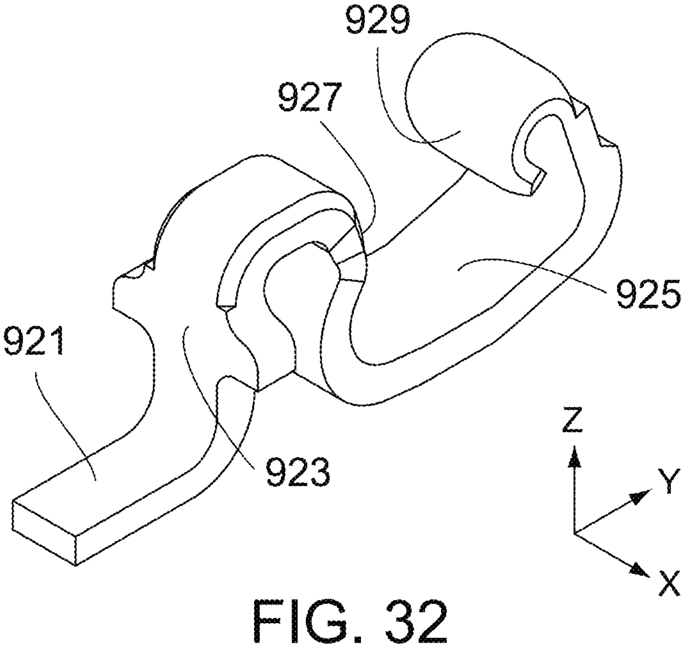
FIG. 32 PRIOR ART
FIG. 32 is a perspective view showing one of terminals included in the connector of FIG. 31.

In place of each of the first terminals 26 and each of the second terminals 28 of the connector 10A, a first terminal 26C shown in FIG. 26 and a second terminal 28 shown in FIG. 27 may be used, respectively. Each of the first terminal 26 and the second terminal 28 is bent similarly to the terminal 20B of FIG. 25. In that case, if necessary, a shape of the housing 30A may be adjusted so that it becomes suitable for the first terminals 26C and the second terminals 28C. Also in the present modification, advantages similar to those of the connector 10 of the first embodiment can be obtained.

[Third Modification]

Referring to FIGS. 28, 29, 29A, 29B, 30, 30A and 30B, in a connector 10D of the present modification, a configuration of terminals 20 of one of terminal rows 22 and 24 and a configuration of terminals 20 of a remaining one of the terminal rows 22 and 24 are arranged so that they are mirror images of each other about a line parallel to the pitch direction and passing through the middle of the terminal rows 22 and 24. When a distance between the second mount portions 203 of the two terminals 20 adjacent to each other in the width direction is sufficient, it is not necessary that the configuration of the terminals 20 of one of the terminal rows 22 and 24 and the configuration of the terminals 20 of the remaining one of the terminal rows 22 and 24 are arranged in rotation symmetry about an axis passing through the middle of the terminal rows 22 and 24 along the up-down direction. For the connector 10A of the second embodiment, similar modification is applicable.

[Fourth Modification]

Although the mating connector 50 of the first embodiment includes the two types of the mating terminals 60 which are different from each other in shape, it may include only the second mating terminals 603. Even when each of the second mating terminals 603 has a first mating mount portion 611 and a second mating mount portion 615, a distance between two of the mating terminals 60 adjacent to each other can be reduced.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A method of mounting a connector on a substrate, wherein:

the connector comprises a plurality of terminals and a housing which holds the terminals;

the housing has a bottom surface;

the terminals are arranged in a pitch direction;

each of the terminals has a first mount portion, a second mount portion, a first contact portion, a second contact portion and a supporting portion;

the first contact portion and the second contact portion are to be brought into contact with a mating terminal of a mating connector when the connector is mated with the mating connector;

the supporting portion is resiliently deformable at least in part and extends from the first contact portion to support the second contact portion;

the second contact portion faces the first contact portion in a width direction perpendicular to the pitch direction and is movable in the width direction by using resilient deformation of the supporting portion;

the second mount portion is formed on a part of the supporting portion and apart from the first mount portion in the width direction;

the first mount portion and the second mount portion protrude downward from the bottom surface of the housing in an up-down direction perpendicular to both the pitch direction and the width direction;

in a plane perpendicular to the pitch direction, positions of the first mount portion, the second mount portion, the first contact portion and the second contact portion of each of the terminals are identical with those of any other of the terminals; and the method comprises soldering the first mount portion of one of two of the terminals adjacent to each other in the pitch direction to a pad on the substrate without soldering the second mount portion of the one of the adjacent terminals, and soldering the second mount portion of a remaining one of the adjacent terminals to another pad on the substrate without soldering the first mount portion of the remaining one of the adjacent terminals.

2. A connector comprising a plurality of terminals and a housing which holds the terminals, wherein:

the housing has a bottom surface;

the terminals are arranged in a pitch direction;

each of the terminals has a first mount portion, a second mount portion, a first contact portion, a second contact portion and a supporting portion;

the first contact portion and the second contact portion are to be brought into contact with a mating terminal of a mating connector when the connector is mated with the mating connector;

the supporting portion is resiliently deformable at least in part and extends from the first contact portion to support the second contact portion;

the second contact portion faces the first contact portion in a width direction perpendicular to the pitch direction and is movable in the width direction by using resilient deformation of the supporting portion;

the second mount portion is formed on a part of the supporting portion and apart from the first mount portion in the width direction;

the first mount portion and the second mount portion protrude downward from the bottom surface of the housing in an up-down direction perpendicular to both the pitch direction and the width direction; and in a plane perpendicular to the pitch direction, positions of the first mount portion, the second mount portion, the first contact portion and the second contact portion of each of the terminals are identical with those of any other of the terminals.

3. The connector as recited in claim 2, wherein:

in the up-down direction, the connector is mateable with a mating connector which has a mating lock portion; and the first contact portion serves as a lock portion which locks a mating state together with the mating lock portion when the connector and the mating connector are in the mating state.

4. The connector as recited in claim 2, wherein the second mount portion is located between the first contact portion and the second contact portion in the width direction.

5. The connector as recited in claim 4, wherein the second mount portion of the terminal located in either each of even-numbered positions or each of odd-numbered positions in the pitch direction is dented in the pitch direction.

6. The connector as recited in claim 2, wherein the second contact portion is located between the second mount portion and the first contact portion in the width direction.

7. The connector as recited in claim 6, wherein:

the housing is provided with inspection windows which correspond to the second mount portions of the terminals at least alternately;

each of the inspection windows opens upward; and when the connector is mounted on the substrate, each of the inspection windows allows fixing of the second mount portion corresponding thereto on the substrate to be visible therethrough.

8. The connector as recited in claim 2, wherein when viewed in the pitch direction, the terminals have same shapes as one another.

9. The connector as recited in claim 2, wherein the second mount portion protrudes as a lowest part of the supporting portion.

10. The connector as recited in claim 2, wherein:

the connector comprises two terminal rows;

each of the terminal rows has the terminals;

in each of the terminal rows, the terminals are arranged in the pitch direction;

the terminal rows are arranged in the width direction; and a configuration of the terminals of one of the terminal rows and a configuration of the terminals of a remaining one of the terminal rows are arranged in rotation symmetry.

11. The connector as recited in claim 2, wherein:

the connector comprises two terminal rows;

each of the terminal rows has the terminals;

in each of the terminal rows, the terminals are arranged in the pitch direction;

the terminal rows are arranged in the width direction; and a configuration of the terminals of one of the terminal rows and a configuration of the terminals of a remaining one of the terminal rows are arranged in line symmetry about a line parallel to the pitch direction and passing a middle of the terminal rows.

12. A device comprising the connector as recited in claim 2 and the substrate, wherein:

a plurality of pads is arranged on the substrate in staggered arrangement;

the pads correspond to the terminals, respectively;

to each of the pads, one of the first mount portion and the second mount portion of the terminal corresponding thereto is fixed; and the first mount portions and the second mount portions of the terminals arranged in the pitch direction are fixed to the pads, alternately.

13. A mating connector which is mateable with the connector as recited in claim 2, wherein:

the mating connector comprises a plurality of mating terminals and a mating housing which holds the mating terminals;

one of two of the mating terminals adjacent to each other in the pitch direction has a first mating mount portion, and a remaining one of the adjacent mating terminals has a second mating mount portion;

one of two of the mating terminals adjacent to each other in the pitch direction does not have the second mating mount portion; and the first mating mount portion and the second mating mount portion are apart from each other in the width direction.

14. The mating connector as recited in claim 13, wherein the mating housing is provided with mating inspection windows which correspond to the second mating mount portions, respectively.

15. The mating connector as recited in claim 13, wherein:

each of the mating terminals has a mating lock portion; and in a plane perpendicular to the pitch direction, a position of the mating lock portion of each of the mating terminals is identical with that of any other of the mating terminals.

16. A mating device comprising the mating connector as recited in claim 13 and a mating substrate, wherein:

on the mating substrate, a plurality of mating pads is arranged in staggered arrangement;

the mating pads correspond to the mating terminals, respectively;

to each of the mating pads, either the first mating mount portion or the second mating mount portion of the mating terminal corresponding thereto is fixed; and the first mating mount portions and the second mating mount portions of the mating terminals arranged in the pitch direction are fixed to the mating pads, alternately.

* * * * *